(12) United States Patent
Tanemura et al.

(10) Patent No.: US 12,542,143 B2
(45) Date of Patent: Feb. 3, 2026

(54) MICROPHONE SYSTEM

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Tomoki Tanemura, Nisshin (JP); Takashi Takazawa, Nisshin (JP); Yoshinori Tsuchiya, Nisshin (JP); Masaaki Kawauchi, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 290 days.

(21) Appl. No.: 18/320,656

(22) Filed: May 19, 2023

(65) Prior Publication Data

US 2023/0402049 A1 Dec. 14, 2023

(30) Foreign Application Priority Data

Jun. 9, 2022 (JP) .................... 2022-093838

(51) Int. Cl.
*G10L 21/0224* (2013.01)
*G10L 21/0208* (2013.01)
(Continued)

(52) U.S. Cl.
CPC .......... *G10L 21/0224* (2013.01); *G10L 25/51* (2013.01); *G10L 25/84* (2013.01);
(Continued)

(58) Field of Classification Search
CPC ............ G10L 21/0224; G10L 21/0216; G10L 21/0208; G10L 25/51; G10L 25/84; G10L 21/0316; G10L 21/0364; G10L 25/30; G10L 25/15; G10L 15/20; G10L 15/16; G10L 2021/02082; G10L 2021/02166;
(Continued)

(56) References Cited

U.S. PATENT DOCUMENTS

2006/0222184 A1 10/2006 Buck et al.
2009/0306973 A1 12/2009 Hiekata et al.
(Continued)

FOREIGN PATENT DOCUMENTS

JP H06-149290 A 5/1994
JP H11-298990 A 10/1999
(Continued)

*Primary Examiner* — Yogeshkumar Patel
(74) *Attorney, Agent, or Firm* — Posz Law Group, PLC

(57) ABSTRACT

A microphone system for a vehicle cabin as an acoustic space includes a microphone array, and a processor and a memory. The processor causes a microphone disposed in an acoustic space to collect sound, classifies a sound included in a sound data related to the sound collected by the microphone into a type of speech sound of a human present in the acoustic space and a type of noise that is a sound other than the speech sound based on a value related to a reflection sound reflected in the acoustic space, and outputs data related to the classified speech sound to a speech recognition device.

33 Claims, 10 Drawing Sheets

(51) Int. Cl.
*G10L 21/0216* (2013.01)
*G10L 25/51* (2013.01)
*G10L 25/84* (2013.01)
*H04R 1/40* (2006.01)
*H04R 3/00* (2006.01)

(52) U.S. Cl.
CPC .............. *H04R 1/406* (2013.01); *H04R 3/005* (2013.01); *G10L 2021/02082* (2013.01); *G10L 2021/02166* (2013.01); *H04R 2410/01* (2013.01)

(58) Field of Classification Search
CPC ...... G10L 2015/0631; G10L 2055/783; H04R 1/406; H04R 3/005; H04R 29/005; H04R 2410/01; H04R 2499/13; G01S 15/104; G01S 15/04; G01S 15/50
See application file for complete search history.

(56) References Cited

U.S. PATENT DOCUMENTS

| | | |
|---|---|---|
| 2010/0103776 A1 | 4/2010 | Chan |
| 2016/0011850 A1 | 1/2016 | Sheen et al. |
| 2016/0014510 A1 | 1/2016 | Sheen |
| 2016/0014511 A1 | 1/2016 | Sheen et al. |
| 2016/0014534 A1 | 1/2016 | Sheen |
| 2016/0111109 A1* | 4/2016 | Tsujikawa ............... H04R 3/005 |
| | | 704/226 |
| 2016/0316305 A1 | 10/2016 | Sheen et al. |
| 2017/0083279 A1 | 3/2017 | Sheen |
| 2017/0289716 A1* | 10/2017 | Mizumoto ........... H04R 29/005 |
| 2019/0073192 A1 | 3/2019 | Sheen |
| 2020/0042285 A1* | 2/2020 | Choi ....................... G10L 25/84 |
| 2020/0077224 A1 | 3/2020 | Ohnuma |
| 2020/0301652 A1 | 9/2020 | Sheen |
| 2021/0099796 A1 | 4/2021 | Usami et al. |
| 2021/0158799 A1 | 5/2021 | Zhang et al. |
| 2021/0193162 A1* | 6/2021 | Hook ...................... G10L 17/00 |
| 2022/0137918 A1 | 5/2022 | Sheen |
| 2023/0003880 A1* | 1/2023 | Ding ....................... G01S 15/04 |

FOREIGN PATENT DOCUMENTS

| | | |
|---|---|---|
| JP | 2012-134842 A | 7/2012 |
| JP | 2021-012314 A | 2/2021 |
| JP | 2021-197658 A | 12/2021 |

* cited by examiner

MICROPHONE SYSTEM

CROSS REFERENCE TO RELATED APPLICATION

The present application claims the benefit of priority from Japanese Patent Application No. 2022-093838 filed on Jun. 9, 2022, the entire disclosures of which are incorporated herein by reference.

TECHNICAL FIELD

The present disclosure relates to a microphone system.

BACKGROUND

It has been known a sound collection processing device that separates an acoustic signal from an object from an acoustic signal acquired by a microphone array on the basis of coordinates and features of the object.

SUMMARY

The present disclosure describes a microphone system. According to nan aspect, a microphone system causes a microphone disposed in an acoustic space to collect a sound, classifies a sound included in a sound data relating to the sound collected by the microphone into a type of speech sound of a human present in the acoustic space and a type of noise that is a sound other than the speech sound based on a value related to a reflection sound reflected in the acoustic space, and outputs data related to the classified speech sound to a speech recognition device.

BRIEF DESCRIPTION OF THE DRAWINGS

Objects, features, and advantages of the present disclosure will become more apparent from the following detailed description made with reference to the accompanying drawings, in which like parts are designated by like reference numbers and in which.

DETAILED DESCRIPTION

Figure 1:
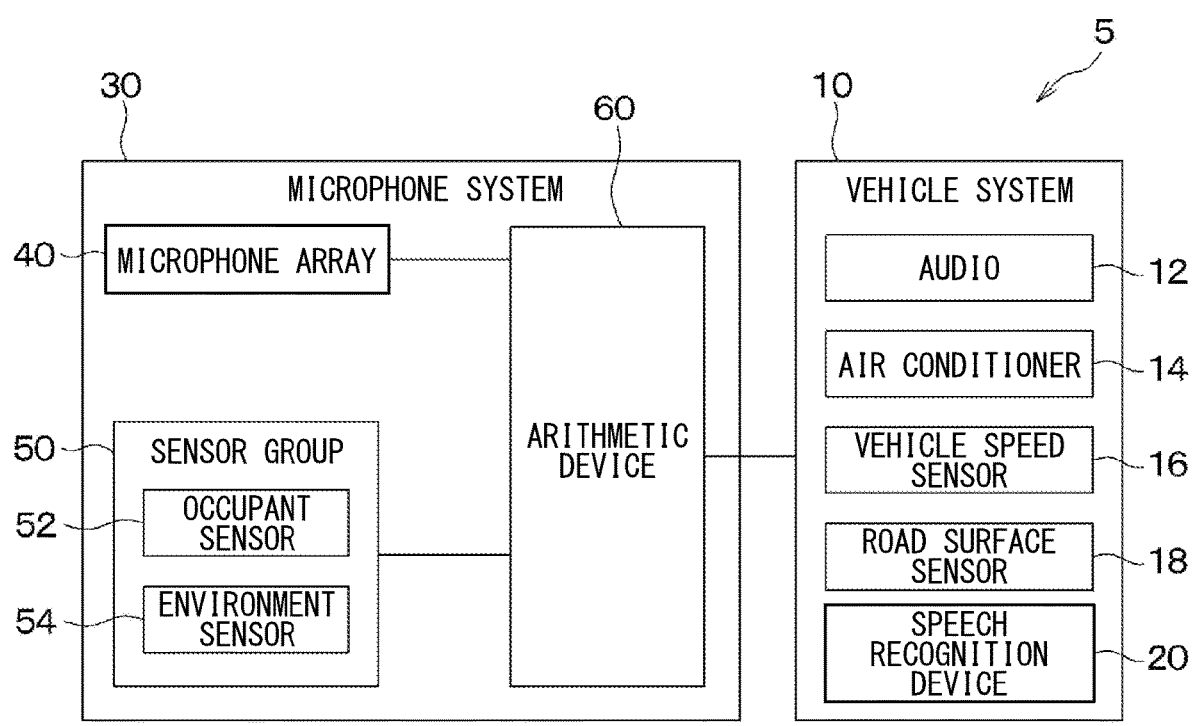
FIG. 1 is a block diagram illustrating a configuration of a vehicle in which a microphone system according to a first embodiment is used.

To begin with, a relevant technology will be described only for understanding the embodiments of the present disclosure.

For example, a sound collection processing device that separates an acoustic signal from an object from an acoustic signal acquired by a microphone array on the basis of coordinates and features of the object has been known. According to the studies by the inventors of the present disclosure, the known sound collection processing device separates the acoustic signal from the object on the basis of coordinates and features of the object. However, if noise due to a space, such as a reflected sound generated in a space where the object is present, is not taken into consideration, a signal-to-noise ratio (SNR) related to the sound from the object is likely to decrease. As a result, when the object is, for example, a human, the SNR related to a speech sound decreases, and thus a speech recognition rate related to the object decreases. The SNR is a ratio of a signal relative to noise. The speech recognition rate is a degree of matching between a sentence of actually spoken content and a sentence of characters converted from the speech.

The present disclosure provides a microphone system that suppresses a decrease in a speech recognition rate.

According to an aspect of the present disclosure, a microphone system includes a sound collection unit, a clustering unit, and an output unit. The sound collection unit is configured to cause at least one microphone disposed in an acoustic space to collect a sound. The clustering unit is configured to classify a sound included in a sound data related to the sound collected by the microphone into a type of speech sound of a human present in the acoustic space and a type of noise that is a sound other than the speech sound, based on a value related to a reflection sound reflected in the acoustic space. The output unit is configured to output data related to the classified speech sound to a speech recognition device.

Accordingly, the speech sound of an occupant is classified from the sound collected by the microphone in consideration of the noise due to the reflection sound generated in the acoustic space. Therefore, since the noise in the classified speech sound is reduced, a decrease in a signal-to-noise ratio of the speech sound is suppressed. Accordingly, a decrease in the speech recognition rate is suppressed.

Hereinafter, embodiments of the present disclosure will be described with reference to the drawings. In the following descriptions, the same or equivalent parts will be designated with the same reference numerals throughout the embodiments, and the description thereof will be omitted.

First Embodiment

A microphone system 30 of the present embodiment is, for example, used in a vehicle 5. First, the vehicle 5 will be described.

As shown in FIG. 1, the vehicle 5 includes a vehicle system 10 and a microphone system 30. The vehicle system 10 is provided with an audio 12, an air conditioner 14, a vehicle speed sensor 16, a road surface sensor 18, a speech recognition device 20, and the like.

The audio 12 reads a recorded sound source and amplifies a read signal. The audio 12 emits a sound corresponding to the amplified signal into a cabin of the vehicle 5. Further, the audio 12 outputs a signal corresponding to a sound pressure of the sound emitted into the vehicle cabin to the microphone system 30, which will be described later.

The air conditioner 14 is an air conditioning apparatus and has a face air outlet, a foot air outlet, a defroster air outlet, and a blower (not shown). The air conditioner 14 causes air for adjusting the temperature and humidity of the vehicle cabin to be blown into the vehicle cabin from the face air outlet, the foot air outlet, or the defroster air outlet (not shown). The air conditioner 14 outputs, to the microphone system 30, a signal indicating an air outlet mode and a signal corresponding to the volume of air to be blown. The face air outlet defines an opening toward a backrest or a headrest of a seat 6 in the vehicle cabin shown in FIG. 2. The face air outlet is opened and closed by a face air outlet door (not shown). The foot air outlet defines an opening toward a seat portion of the seat 6 or a lower part of the seat portion in the vehicle cabin. The foot air outlet is opened and closed by a foot air outlet door (not shown). The defroster air outlet defines an opening toward an inner surface of a front window (not shown) of the vehicle 5. The defroster air outlet is opened and closed by a defroster outlet door (not shown). The air outlet mode represents open/closed states of the face air outlet, the foot air outlet, and the defroster air outlet.

The vehicle speed sensor 16 detects a vehicle speed and outputs a signal corresponding to the detected vehicle speed to the microphone system 30. The vehicle speed means the speed of the vehicle 5.

The road surface sensor 18 detects the state of a road surface on which the vehicle 5 travels by using an external camera, a LiDAR, or the like. For example, the road surface sensor 18 detects unevenness of the road surface on which the vehicle 5 travels by using an image captured by the external camera and pattern matching, thereby to detect the state of the road surface on which the vehicle 5 travels. For example, the road surface sensor 18 detects a surface roughness of the road surface on which the vehicle travels 5 by using the LiDAR, thereby to detect the state of the road surface on which the vehicle 5 travels. The road surface sensor 18 outputs a signal corresponding to the detected state of the road surface to the microphone system 30. The LiDAR is an abbreviation for light detection and ranging. The surface roughness is, for example, represented by a root mean square height, a maximum mountain height, a maximum valley height, a maximum height, a calculated average height, or the like.

The speech recognition device 20 converts speech sound data output from the microphone system 30 into character data by using a speech recognition engine or the like. The speech recognition device 20 outputs, for example, a signal corresponding to a converted character data to a display (not shown). Accordingly, characters corresponding to the speech of an occupant in the vehicle cabin are displayed on the display (not shown), as well as various systems (not shown) of the vehicle 5 are caused to operate in accordance with character strings.

Figure 2:
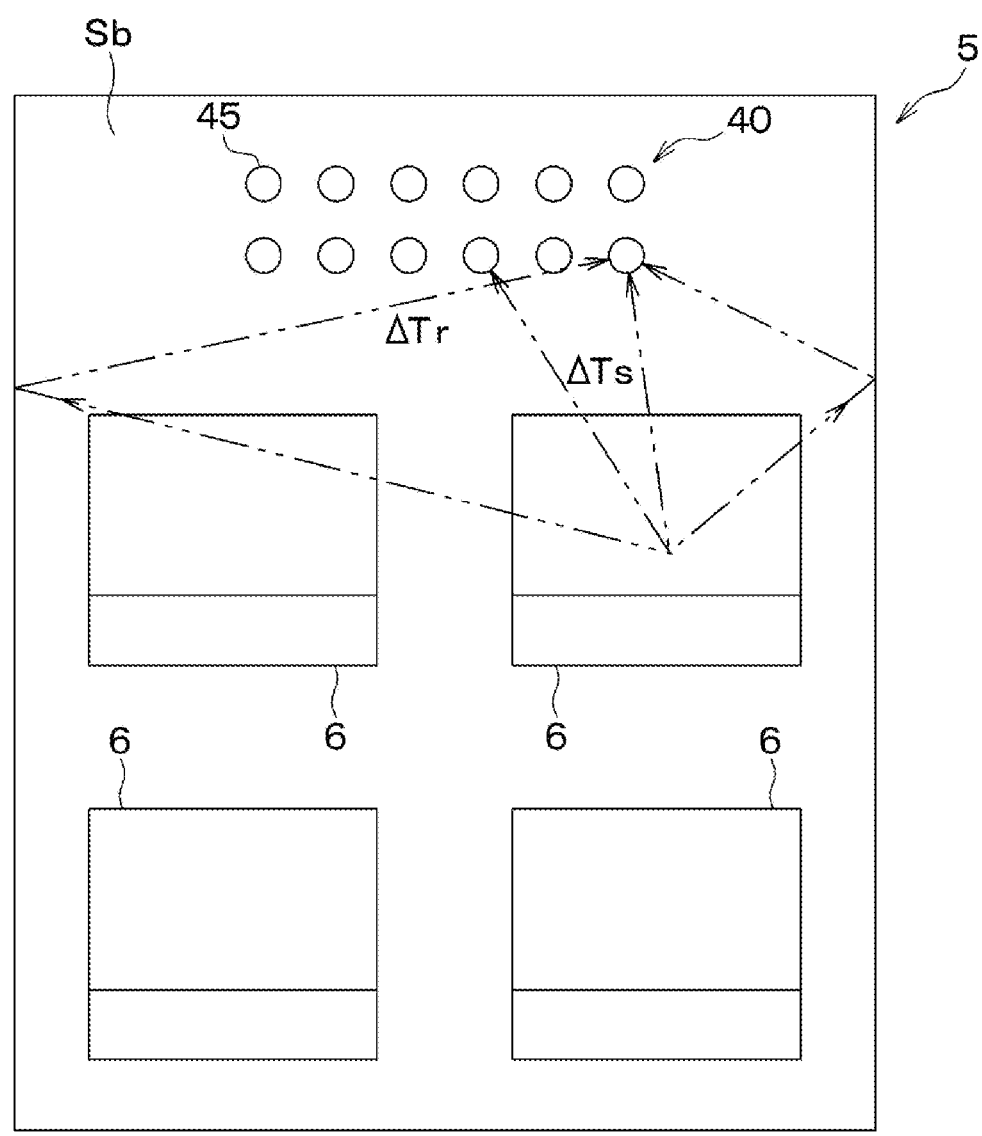
FIG. 2 is a schematic diagram illustrating an acoustic space in a cabin of the vehicle.

The microphone system 30 includes a microphone array 40, a sensor group and an arithmetic device 60. The microphone array 40 includes a plurality of microphones 45, which are arranged as shown in FIG. 2, to collect sounds.

Referring back to FIG. 1, the sensor group 50 includes an occupant sensor 52 and an environment sensor 54. The occupant sensor 52 includes a weight sensor, an in-vehicle camera, an ultrasonic sensor, or the like. For example, the occupant sensor 52 detects that an occupant in the vehicle cabin is seated on the seat 6 from the weight sensor attached to the seat 6. The occupant sensor 52 uses an image captured by the in-vehicle camera, image recognition, and transmission and reception waves of ultrasonic waves emitted from the ultrasonic sensor. Thus, the occupant sensor 52 detects the position of the occupant and the number of occupants in the vehicle cabin. The occupant sensor 52 outputs a signal corresponding to the detected occupant position and the detected number of occupants in the vehicle cabin to the microphone system 30. The ultrasonic wave is a sound wave having a frequency of kHz or more. The position of the occupant in the vehicle cabin is, for example, represented by the position of the mouth of the occupant in the absolute coordinate system. The reference position of the absolute coordinate system is, for example, the center of gravity of the vehicle 5.

The environment sensor 54 includes an in-vehicle camera, a window opening/closing sensor, or the like. For example, the environment sensor 54 detects the size of an acoustic space Sb in the vehicle cabin and the position, type, and size of an object other than the occupant in the vehicle cabin by using the image captured by the in-vehicle camera and the image recognition. Further, the environment sensor 54 detects a window opening degree by using the window opening/closing sensor. The environment sensor 54 outputs, to the microphone system 30, a signal corresponding to the detected size of the acoustic space Sb in the vehicle cabin, the position, type, and size of the object in the vehicle cabin, and the window opening degree. The object other than the occupant in the vehicle cabin is, for example, a seat 6. The window opening degree is an opening degree of a side window of the vehicle 5.

Figure 3:
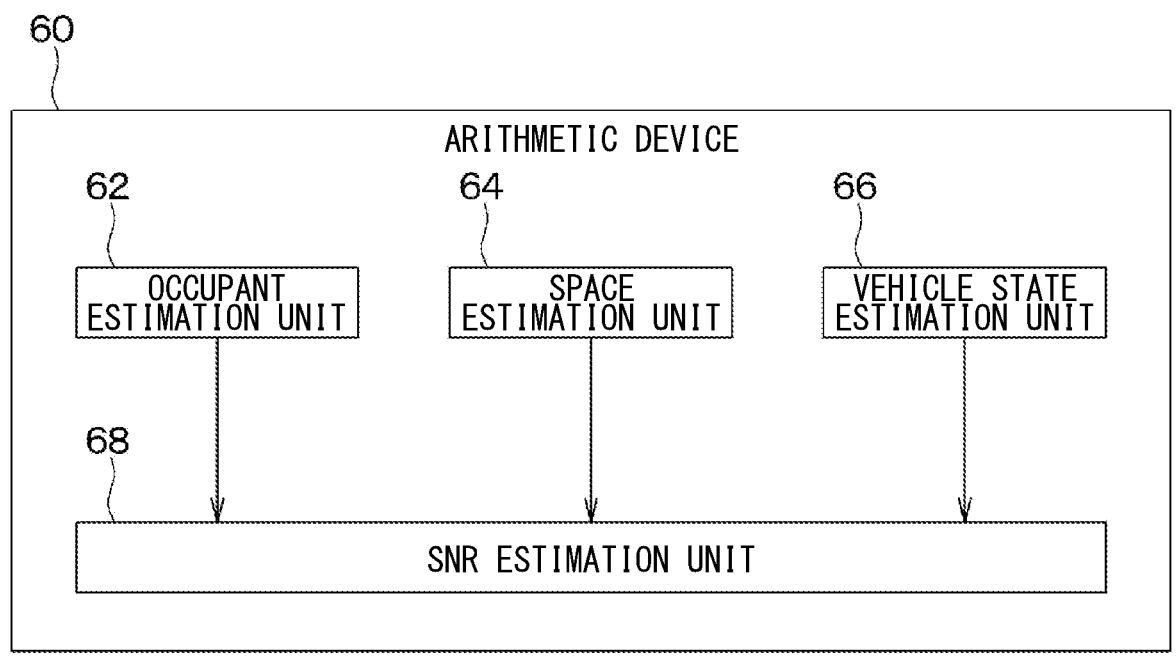
FIG. 3 is a block diagram illustrating a configuration of an arithmetic device of the microphone system.

The arithmetic device 60 is configured mainly by a microcomputer and the like, and includes a CPU, a ROM, a flash memory, a RAM, an I/O, a drive circuit, an A/D converter, a bus line connecting these components, and the like. As shown in FIG. 3, the arithmetic device 60 includes, as functional block, an occupant estimation unit 62, a space estimation unit 64, a vehicle state estimation unit 66, and an SNR estimation unit 68.

The occupant estimation unit 62 executes a program stored in the ROM to estimate the position of an occupant and the number of occupants in the vehicle cabin based on the signal from the occupant sensor 52. Details of the processing of the occupant estimation unit 62 will be described later.

The space estimation unit 64 executes a program stored in the ROM to estimate a state of the space in the vehicle cabin based on the signal from the environment sensor 54. Details of the space estimation unit 64 will be described later.

The vehicle state estimation unit 66 executes a program stored in the ROM to estimate the state of the vehicle 5 based on the signal from the vehicle system 10. Details of the vehicle state estimation unit 66 will be described later.

The SNR estimation unit 68 corresponds to a sound collection unit, a clustering unit, and an output unit. The SNR estimation unit 68 executes a program stored in the ROM to generate speech sound data of the occupant in the vehicle cabin and calculate the SNR based on the signals from the occupant estimation unit 62, the space estimation unit 64, and the vehicle state estimation unit 66. When the SNR calculated has an insufficient value, the SNR estimation unit 68 selects again the microphone 45 used to collect sounds. Further, when the SNR calculated has a sufficient value, the SNR estimation unit 68 outputs the speech sound data generated to the speech recognition device 20, which will be described later. Details of the SNR estimation unit 68 will be described later.

Figure 4:
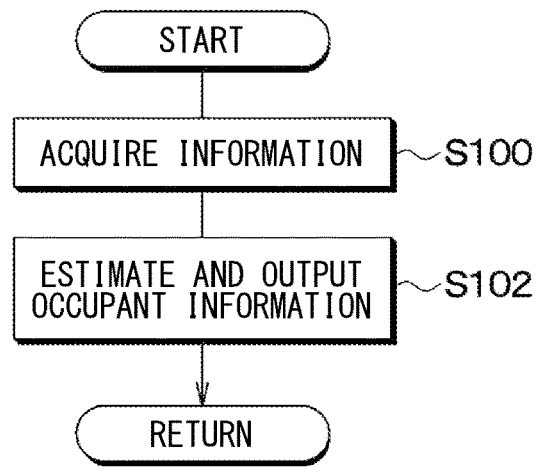
FIG. 4 is a flowchart illustrating processing of an occupant estimation unit of the arithmetic device.

The vehicle 5 has configurations as described above. The microphone system 30 used in the vehicle 5 recognizes a speech sound in the vehicle cabin and suppresses a decrease in a speech recognition rate. Next, in order to describe the speech recognition in the vehicle cabin by the microphone system 30, respective processing performed when the programs of the occupant estimation unit 62, the space estimation unit 64, the vehicle state estimation unit 66, and the SNR estimation unit 68 are executed will be described. First, the processing of the occupant estimation unit 62 will be described with reference to the flowchart of FIG. 4. The program of the occupant estimation unit 62 is executed, for example, when the ignition of the vehicle 5 is turned on. In addition, a period of a series of operations of the occupant estimation unit 62 from the beginning of the process of S100 to the returning to the process of S100 is referred to as a control cycle of the occupant estimation unit 62.

In S100, the occupant estimation unit 62 acquires the signal corresponding to the position of the occupant and the number of occupants in the vehicle cabin from the occupant sensor 52.

Subsequently, in S102, the occupant estimation unit 62 estimates the position of the occupant and the number of the occupants in the vehicle cabin from the signal acquired in S100. The occupant estimation unit 62 outputs a signal corresponding to the estimated position of the occupant and the number of occupants in the vehicle cabin to the SNR estimation unit 68. Thereafter, the processing of the occupant estimation unit 62 returns to S100.

Figure 5:
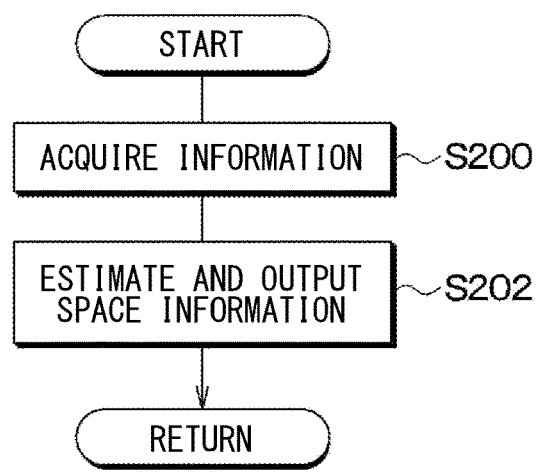
FIG. 5 is a flowchart illustrating processing of a space estimation unit of the arithmetic device.

The occupant estimation unit 62 performs the processing as described above. Next, the processing of the space estimation unit 64 will be described with reference to the flowchart of FIG. 5. The program of the space estimation unit 64 is executed, for example, when the ignition of the vehicle 5 is turned on. A period of a series of operations of the space estimation unit 64 from the beginning of the process of S200 to the return to the process of S200 is referred to as a control cycle of the space estimation unit 64.

In S200, the space estimation unit 64 acquires, from the environment sensor 54, the signals corresponding to the size of the space in the vehicle cabin, the position, type, and size of the object in the vehicle cabin, and the window opening degree.

Subsequently, in S202, the space estimation unit 64 estimates the size of the acoustic space Sb in the vehicle cabin, the position, type, and size of the object in the vehicle cabin, and the window opening degree based on the signals acquired in S200. Thus, the space estimation unit 64 estimates the state of the acoustic space Sb in the vehicle cabin. Further, the space estimation unit 64 outputs a signal corresponding to the estimated state of the acoustic space Sb in the vehicle cabin to the SNR estimation unit 68. Thereafter, the processing of the space estimation unit 64 returns to S200.

Figure 6:
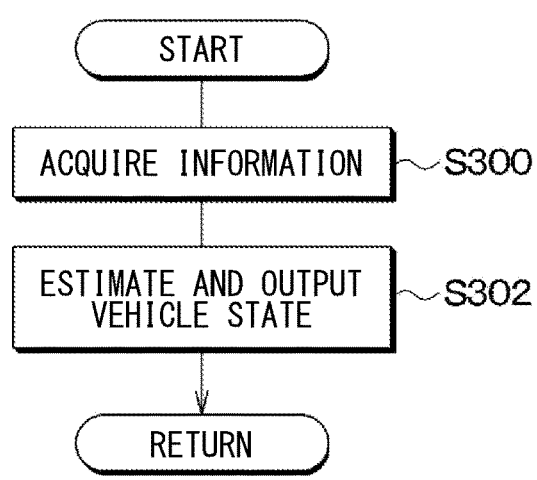
FIG. 6 is a flowchart illustrating processing of a vehicle state estimation unit of the arithmetic device.

The space estimation unit 64 performs the processing as described above. Next, the processing of the vehicle state estimation unit 66 will be described with reference to the flowchart of FIG. 6. The program of the vehicle state estimation unit 66 is executed, for example, when the ignition of the vehicle 5 is turned on. A period of a series of operations of the vehicle state estimation unit 66 from the beginning of the process of S300 to the returning to the process of S300 is referred to as a control cycle of the vehicle state estimation unit 66.

In S300, the vehicle state estimation unit 66 acquires, from the vehicle system 10, the signals corresponding to the state of the audio 12, the state of the air conditioner 14, the speed of the vehicle 5, and the state of the road surface on which the vehicle 5 travels. Specifically, the vehicle state estimation unit 66 acquires, from the audio 12, the signal corresponding to the sound pressure of the sound by the audio 12. Also, the vehicle state estimation unit 66 acquires, from the air conditioner 14, the signal indicating the air outlet mode and the signal corresponding to the volume of air to be blown. Further, the vehicle state estimation unit 66 acquires, from the vehicle speed sensor 16, the signal corresponding to the vehicle speed. The vehicle state estimation unit 66 acquires, from the road surface sensor 18, the signal corresponding to the state of the road surface on which the vehicle 5 travels.

Subsequently, in S302, the vehicle state estimation unit 66 estimates the state of the audio 12, the state of the air conditioner 14, the speed of the vehicle 5, and the state of the road surface on which the vehicle 5 travels based on the signals acquired in S300. Thus, the vehicle state estimation unit 66 estimates the state of the vehicle 5. The vehicle state estimation unit 66 outputs, to the SNR estimation unit 68, signals corresponding to the estimated state of the audio 12, the estimated state of the air conditioner 14, the estimated speed of the vehicle 5, and the estimated state of the road surface on which the vehicle 5 travels.

Figure 7:
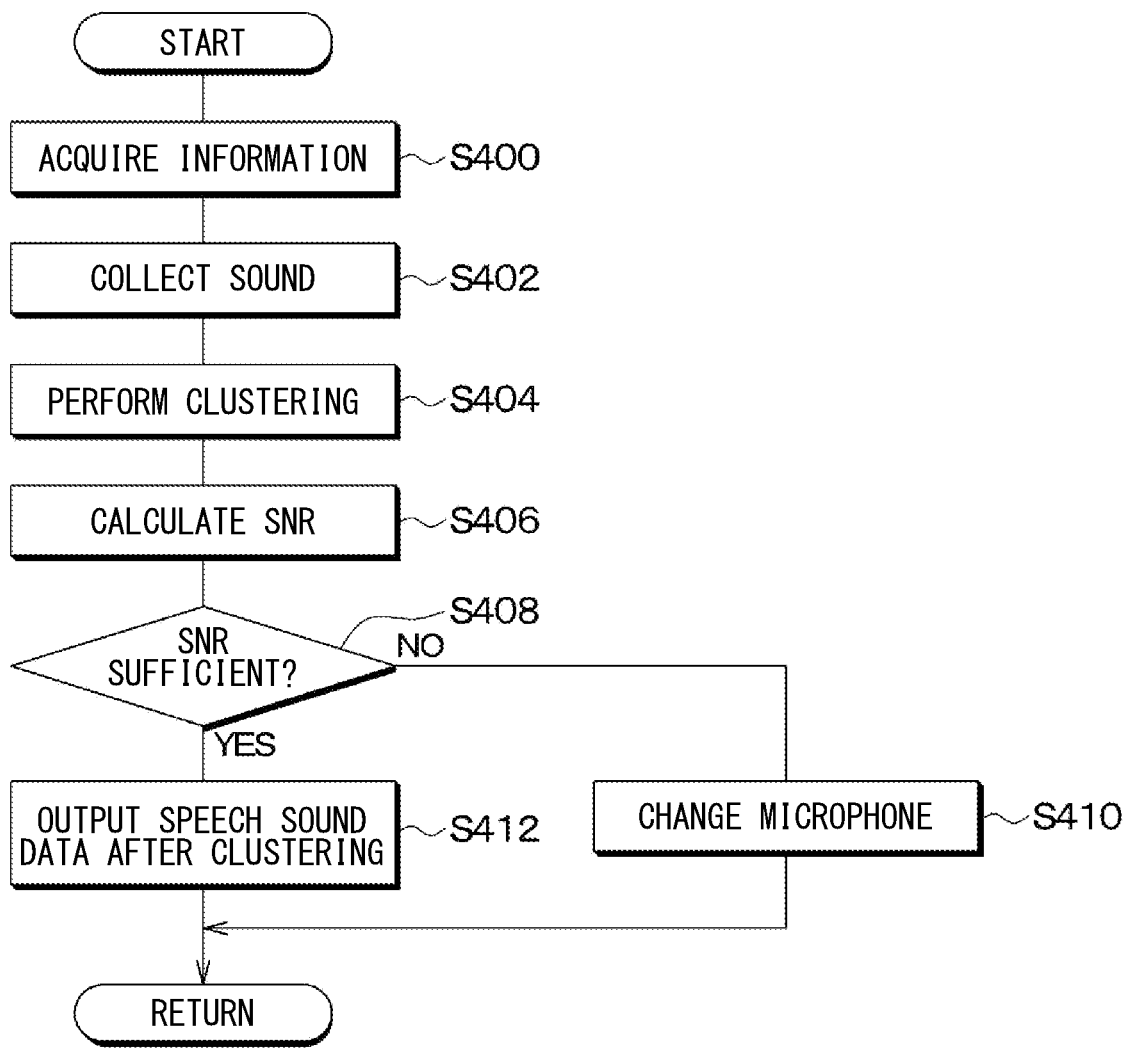
FIG. 7 is a flowchart illustrating processing of a signal-to-noise ratio (SNR) estimation unit of the arithmetic device.

The vehicle state estimation unit 66 performs the processing as described above. Next, the processing of the SNR estimation unit 68 will be described with reference to the flowchart of FIG. 7. The program of the SNR estimation unit 68 is executed, for example, when the ignition of the vehicle 5 is turned on. A period of a series of operations of the SNR estimation unit 68 from the beginning of the process of S400 to the returning to the process of S400 is referred to as a control cycle of the SNR estimation unit 68.

In S400, the SNR estimation unit 68 acquires various types of information. Specifically, the SNR estimation unit 68 acquires, from the occupant estimation unit 62, the signal corresponding to the position of the occupant and the number of occupants in the vehicle cabin. The SNR estimation unit 68 acquires, from the space estimation unit 64, the signal corresponding to the size of the acoustic space Sb in the vehicle cabin, the position, type, and size of the object in the vehicle cabin, and the window opening degree. Further, the SNR estimation unit 68 acquires, from the vehicle state estimation unit 66, the signal corresponding to the sound pressure of the audio 12, the air outlet mode, the air volume of the air conditioner 14, the vehicle speed, and the state of the road surface on which the vehicle 5 travels.

Subsequently, in S402, the SNR estimation unit 68 causes the microphone 45 selected in advance or the microphone 45 selected in S410 described later to collect sounds in the vehicle cabin. The SNR estimation unit 68 generates sound data corresponding to the sounds collected by the microphone 45. The sound data is amplitude data of each time for a time section of a predetermined length.

Subsequently, in S404, the SNR estimation unit 68 classifies the sound data generated in S402 into a speech sound and a noise, and classifies the type of the speech sound and the type of the noise, based on the information acquired in S400. Accordingly, the SNR estimation unit 68 performs clustering of the sound data generated in S402.

Specifically, in order to classify the type of speech sound and the type of noise, the SNR estimation unit 68 firstly estimates the following parameters of each time for the time section of the sound data from the information acquired in S400.

The SNR estimation unit 68 estimates the number of speech sounds from the number of occupants acquired in S400. Further, the SNR estimation unit 68 estimates an utterance time difference OTs from the occupant position acquired in S400, the position of each microphone 45 set in advance, and the sound velocity. As shown in FIG. 2, the utterance time difference OTs is the arrival time difference of the speech sound by utterance of the occupant between the microphones 45.

In addition, the SNR estimation unit 68 estimates a frequency component by performing frequency analysis of the sound data generated in S402 using a fat Fourier transformation (FFT) or the like. Further, the SNR estimation unit 68 estimates the utterance pitch P of the occupant from the sound data generated in S402 using a time-frequency analysis or the like. The utterance pitch P is an interval between notes in the utterance by the occupant.

In addition, the SNR estimation unit 68 estimates the magnitude of absorption of sound and the magnitude of shielding of sound from the type of the object acquired in S400 and a map. Further, the SNR estimation unit 68 estimates a reflection time difference $\Delta Tr$ from the estimated magnitude of sound absorption, the estimated magnitude of sound shielding, the size of the acoustic space Sb in the vehicle cabin, the position and size of the object, and the window opening degree, which are acquired in S400, the sound data generated in S402, and a map. The map for estimating the magnitude of the sound absorption and the magnitude of the sound shielding is set in advance by an experiment, a simulation, or the like. As shown in FIG. 2, the reflection time difference $\Delta Tr$ is the arrival time difference between the sounds reflected in the vehicle cabin with respect to the same microphone 45. Further, the map for estimating the reflection time difference $\Delta Tr$ is set in advance by an experiment, a simulation, or the like.

Figure 8:
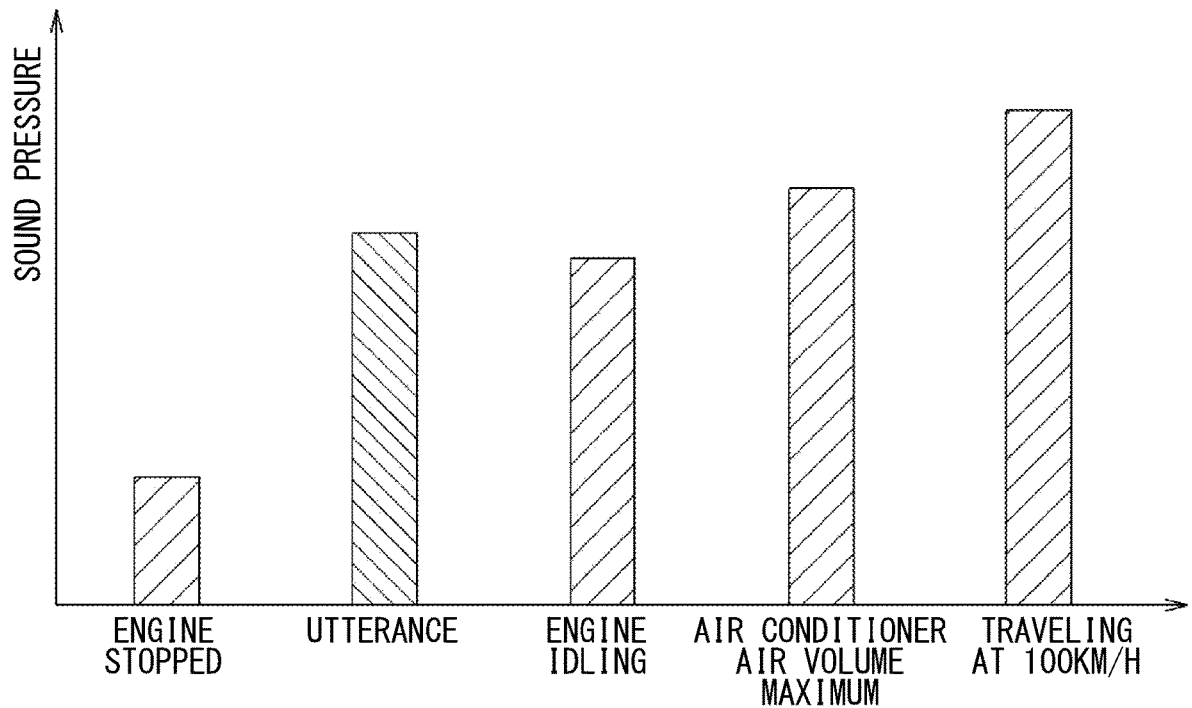
FIG. 8 is a diagram illustrating a relationship between utterance and respective noises and a sound pressure.

In addition, the SNR estimation unit 68 estimates the sound pressure due to the utterance of the occupant from the sound data generated in S402 and a map. Further, the SNR estimation unit 68 estimates the sound pressure due to the audio 12 from the sound pressure of the audio 12 acquired in S400. In addition, the SNR estimation unit 68 estimates the sound pressure due to the air conditioner 14 from the air volume of the air conditioner 14 acquired in S400 and a map. Further, the SNR estimation unit 68 estimates the sound pressure due to the wind noise of the vehicle 5 from the vehicle speed acquired in S400. As shown in FIG. 8, the maps for estimating the sound pressure due to the utterance of the occupant, the air volume of the air conditioner 14, and the wind noise of the vehicle 5 are set in advance by an experiment, a simulation, or the like.

In addition, the SNR estimation unit 68 estimates the position of the sound generated from the audio 12 from the setting state of the audio 12 acquired in S400. The SNR estimation unit 68 estimates an audio sound time difference $\Delta Ta$ from the estimated sound generation position by the audio 12, the position of each microphone set in advance, and the sound velocity. The SNR estimation unit 68 estimates an air conditioner sound time difference $\Delta Tw$ from the air volume and the air outlet mode of the air conditioner 14 acquired in S400 and a map. Further, the SNR estimation unit 68 estimates a traveling sound time difference $\Delta Tc$ from the vehicle speed and the window opening degree acquired in S400 and a map. The audio sound time difference $\Delta Ta$ is the arrival time difference of the sounds from the audio 12 with respect to the same microphone 45. The air conditioner sound time difference $\Delta Tw$ is the arrival time difference of the sounds by the air conditioner 14 with respect to the same microphone 45. The map for estimating the air conditioner sound time difference $\Delta Tw$ is set in advance by an experiment, a simulation, or the like. The traveling sound time difference $\Delta Tc$ is the arrival time difference of the wind noises of the vehicle 5 with respect to the same microphone 45. The map for estimating the traveling sound time difference $\Delta Tc$ is set in advance by an experiment, a simulation, or the like.

In addition, the SNR estimation unit 68 estimates the sound pressure due to the vibration of the vehicle 5 from the state of the road surface on which the vehicle travels acquired in S400 and a map. The map for estimating the sound pressure due to the vibration of the vehicle 5 is set in advance by an experiment, a simulation, or the like.

Then, the SNR estimation unit 68 classifies the type of sound included in the sound data into the type of speech sound and the type of noise using the estimated number of sounds, the utterance time difference OTs, the frequency component of the sound data, and the utterance pitch P. Also, the SNR estimation unit 68 classifies the type of sound included in the sound data into the type of speech sound and the type of noise using the reflection time difference $\Delta Tr$ estimated above. Further, the SNR estimation unit 68 classifies the type of sound included in the sound data into the type of speech sound and the type of noise by using the sound pressure due to the utterance of the occupant estimated as described above. Furthermore, the SNR estimation unit 68 classifies the type of sound included in the sound data into the type of speech sound and the type of noise using the sound pressure by the audio 12, the sound pressure by the air conditioner 14, the sound pressure by the wind noise of the vehicle 5, and the sound pressure by the vibration of the vehicle 5 estimated above. Moreover, the SNR estimation unit 68 classifies the type of sound included in the sound data into the type of speech sound and the type of noise using the audio sound time difference $\Delta Ta$, the air conditioner sound time difference $\Delta Tw$, and the running sound time difference $\Delta Tc$ estimated above.

For example, it is assumed that the number of occupants is two. One of the two occupants is referred to as a first occupant. The other of the two occupants is referred to as a second occupant. The speech sound of the first occupant is referred to as a first speech sound X1. The speech sound of the second occupant is referred to as a second speech sound X2. The sounds caused by the audio 12, the air conditioner 14, the wind noise of the vehicle 5, and the noise due to vibration of the vehicle 5 are referred to as a first noise Xn1 and a second noise Xn2.

Figure 9:
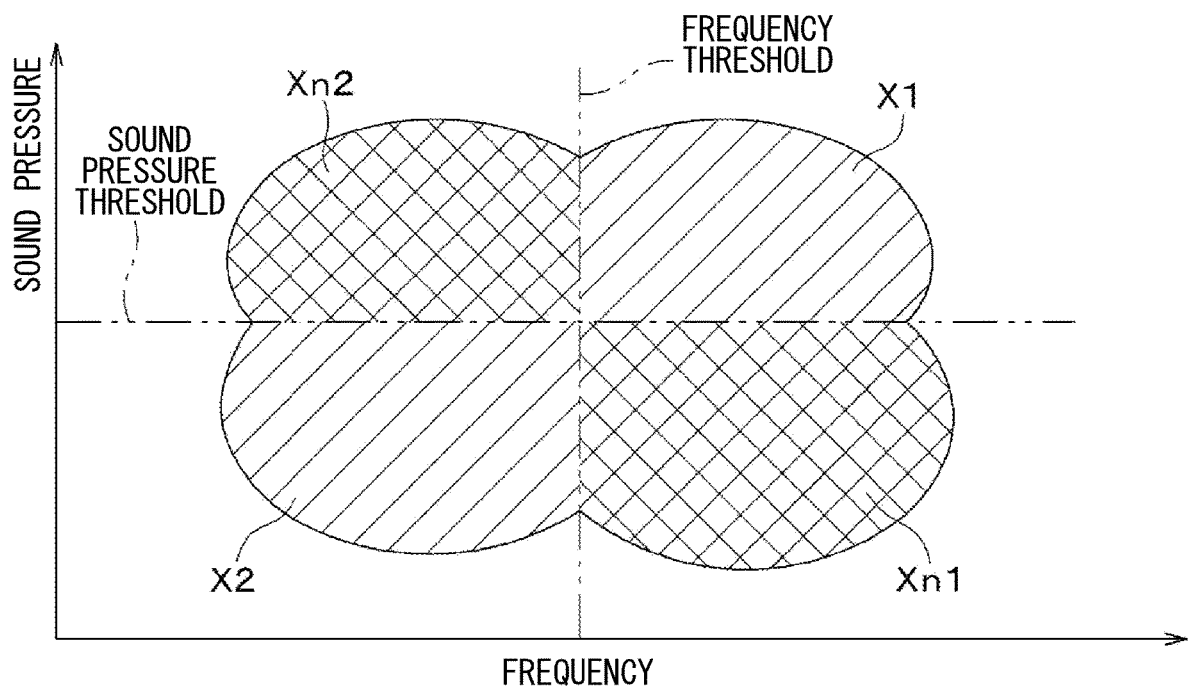
FIG. 9 is a diagram illustrating clustering on the basis of a frequency and a sound pressure.

The number of occupants corresponds to the number of the types of sounds. Further, the voice of the occupant, the sound by the audio 12, the sound by the air conditioner 14, the sound by the wind noise of the vehicle 5, and the sound by the vibration of the vehicle 5 have different frequencies from each other. Therefore, the SNR estimation unit 68 classifies the types of sounds included in the sound data into the first speech sound X1, the second speech sound X2, the first noise Xn1, and the second noise Xn2 using the sound data subjected to the frequency analysis described above and the frequency threshold value. As a result, for example, as shown in FIG. 9, a sound having a frequency equal to or higher than the frequency threshold value is classified into the first speech sound X1 and the first noise Xn1. Further, a sound having a frequency less than the frequency threshold value is classified into the second speech sound X2 and the second noise Xn2. The frequency threshold value is set by an experiment, a simulation, machine learning, or the like so that the first speech sound X1, the second speech sound X2, the first noise Xn1, and the second noise Xn2 are classified.

The voice of the occupant, the sound of the audio 12, the sound of the air conditioner 14, the sound of the wind noise of the vehicle 5, and the noise due to the vibration of the vehicle 5 have different sound pressures from each other. Therefore, the SNR estimation unit 68 classifies the type of sound included in the sound data into the first speech sound X1, the second speech sound X2, the first noise Xn1, and the second noise Xn2 using the amplitude of the sound data generated in S402, the various sound pressures estimated above, and the sound pressure threshold value. As a result, for example, as shown in FIG. 9, a sound having a sound pressure equal to or higher than the sound pressure threshold value is classified into the first speech sound X1 and the second noise Xn2. Further, a sound having a sound pressure lower than the sound pressure threshold value is classified into the second speech sound X2 and the first noise Xn1. The sound pressure threshold value is set by an experiment, a simulation, machine learning, or the like so that the first speech sound X1, the second speech sound X2, the first noise Xn1, and the second noise Xn2 are classified.

As a result, a sound having a frequency equal to or higher than the frequency threshold value and a sound pressure equal to or higher than the sound pressure threshold value is classified as the first speech sound X1. Further, a sound having a frequency less than the frequency threshold value and a sound pressure less than the sound pressure threshold value is classified as the second speech sound X2. A sound having a frequency equal to or higher than the frequency threshold value and a sound pressure lower than the sound pressure threshold value is classified as the first noise Xn1. Further, a sound having a frequency less than the frequency threshold value and a sound pressure equal to or greater than the sound pressure threshold value is classified as the second noise Xn2. In this way, the SNR estimation unit 68 classifies the types of sounds included in the sound data into the first speech sound X1, the second speech sound X2, the first noise Xn1, and the second noise Xn2. In FIG. 9, the ranges of the first speech sound X1 and the second speech sound X2 are indicated with hatching of diagonal lines in order to clarify the ranges of the first speech sound X1 and the second speech sound X2. Further, the ranges of the first noise Xn1 and the second noise Xn2 are indicated with cross line hatching in order to clarify the ranges of the first noise Xn1 and the second noise Xn2.

The utterance pitch P is different depending on the occupant. Therefore, the SNR estimation unit 68 classifies the types of sounds included in the sound data into the first speech sound X1, the second speech sound X2, the first noise Xn1, and the second noise Xn2 using the utterance pitch P estimated above and the pitch threshold value. Further, since the occupant position is different depending on the occupant, the utterance time difference OTs is different. Therefore, the SNR estimation unit 68 classifies the types of sounds included in the sound data into the first speech sound X1, the second speech sound X2, the first noise Xn1, and the second noise Xn2 using the utterance time difference OTs estimated above and the utterance threshold value. In addition, since the reverberations of the speech sound of the occupant and the noise sound are different depending on the state of the acoustic space Sb in the vehicle cabin, the reflection time differences $\Delta$Tr are different. Therefore, the SNR estimation unit 68 classifies the types of sounds included in the sound data into the first speech sound X1, the second speech sound X2, the first noise Xn1, and the second noise Xn2 using the reflection time difference $\Delta$Tr estimated above and a reflection threshold value. Further, the audio sound time difference $\Delta$Ta is different depending on the sound generation position of the audio 12. Therefore, the SNR estimation unit 68 classifies the types of sounds included in the sound data into the first speech sound X1, the second speech sound X2, the first noise Xn1, and the second noise Xn2 using the audio sound time difference $\Delta$Ta estimated as described above and the audio time difference threshold value. The air conditioner sound time difference $\Delta$Tw varies depending on the air outlet mode. Therefore, the SNR estimation unit 68 classifies the types of sounds included in the sound data into the first speech sound X1, the second speech sound X2, the first noise Xn1, and the second noise Xn2 using the air conditioner sound time difference $\Delta$Tw estimated above and the air conditioner time difference threshold value. Further, the traveling sound time difference $\Delta$Tc varies depending on each window opening degree. Therefore, the SNR estimation unit 68 classifies the types of sounds included in the sound data into the first speech sound X1, the second speech sound X2, the first noise Xn1, and the second noise Xn2 using the traveling sound time difference $\Delta$Tc estimated above and the traveling sound time difference threshold value. Accordingly, the SNR estimation unit 68 classifies the types of sounds included in the sound data into the first speech sound X1, the second speech sound X2, the first noise Xn1, and the second noise Xn2. The pitch threshold value, the speech threshold value, the reflection threshold value, the audio time difference threshold value, the air conditioner time difference threshold value, and the traveling sound time difference threshold value are set by experiments, simulations, machine learning, or the like so that the first speech sound X1, the second speech sound X2, the first noise Xn1, and the second noise Xn2 are classified.

The SNR estimation unit 68 generates speech sound data of each type of the speech sound classified as described above, such as speech sound data of the first speech sound X1 and speech sound data of the second speech sound X2 by extracting from the sound data generated in S402.

Subsequently, in S406, the SNR estimation unit 68 calculates the SNR of each speech sound data generated in S404. Specifically, the SNR estimation unit 68 divides the sum of the amplitudes of each time in the speech sound data by the sum of the amplitudes of each time of the sound recorded in the vehicle cabin in a state where the occupant does not utter in the speech sound data. Thus, the SNR estimation unit 68 calculates the SNR for each speech sound data.

For example, the sum of the amplitudes of each time of the first speech sound X1 is defined as S1. The sum of the amplitudes of each time of the second speech sound X2 is defined as S2. The sum of the amplitudes of each time of the sound in the first speech sound X1 recorded in the vehicle cabin in a state where the first occupant does not utter is defined as N1. The sum of the amplitudes of each time of the sound in the second speech sound X2 recorded in the vehicle cabin in a state where the second occupant does not utter is defined as N2. In this case, the SNR of the first speech sound X1 is expressed as S1/N1. The SNR of the second speech sound X2 is expressed as S2/N2.

Figure 10:
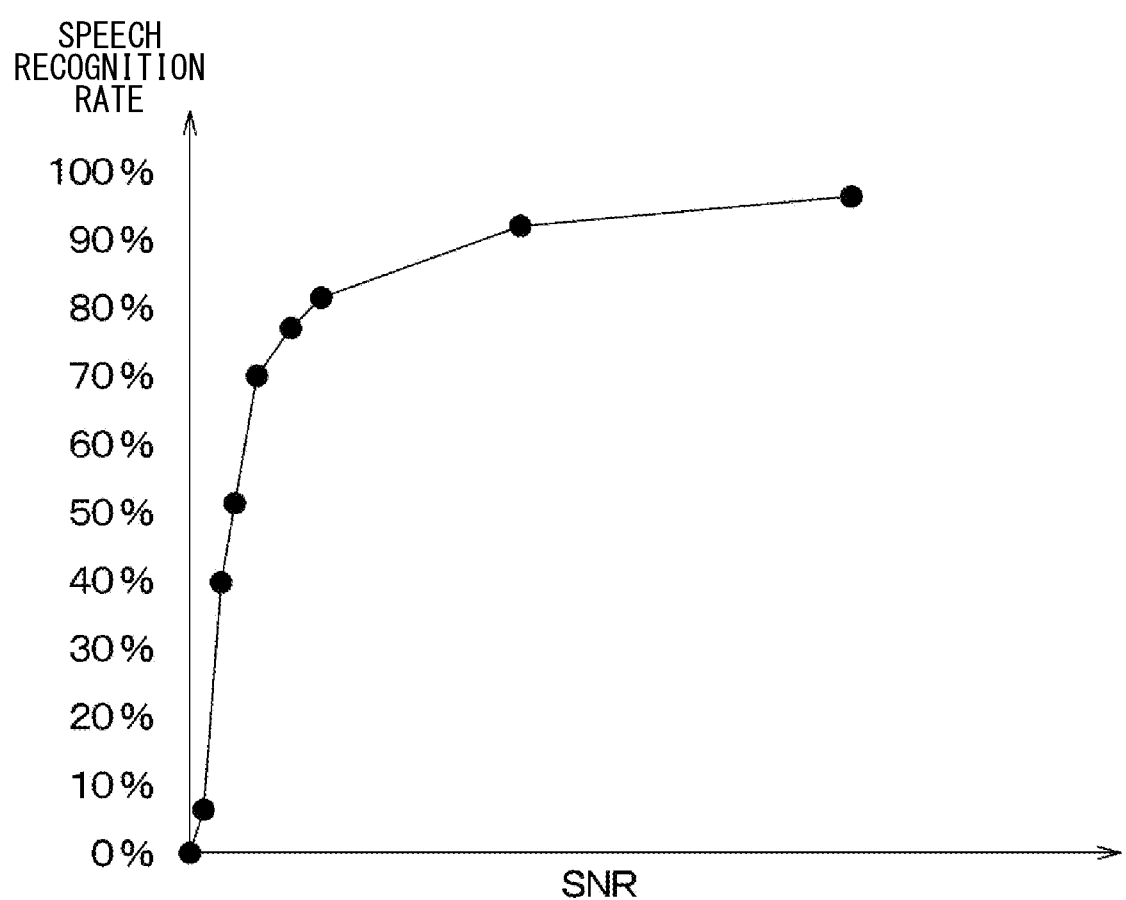
FIG. 10 is a diagram illustrating a relationship between an SNR and a speech recognition rate.

Subsequently, in S408, the SNR estimation unit 68 determines whether or not the SNR calculated in S406 is equal to or greater than the SN threshold SNR_th. Accordingly, the SNR estimation unit 68 determines whether or not the SNR is sufficient. As illustrated in FIG. 10, the speech recognition rate increases with an increase in the SNR. Therefore, the SN threshold SNR_th is set by an experiment, a simulation, or the like such that the speech recognition rate is at a sufficient level, such as 80% or more.

The SNR estimation unit 68 determines that the SNR is insufficient when the SNR of the speech sound data of the occupant designated by the occupant's button operation or the like, among the SNRs calculated in S406, is less than the SN threshold SNR_th. Thereafter, the processing of the SNR estimation unit 68 proceeds to S410. The SNR estimation unit 68 determines that the SNR is sufficient when the SNR of the speech sound data of the occupant designated by the occupant's button operation or the like, among the SNRs calculated in S406, is equal to or greater than the SN threshold SNR_th. Thereafter, the processing of the SNR estimation unit 68 proceeds to S412. Note that, although the SNR estimation unit 68 determines that the SNR is sufficient when the SNR of the speech sound data of the designated occupant is equal to or greater than the SN threshold SNR_th, the configuration is not limited this example. For example, the SNR estimation unit 68 may determine that the SNR is sufficient when the speech sound data of the plurality of occupants is equal to or greater than the SN threshold SNR_th.

In S410 subsequent to S408, since the SNR is insufficient, the SNR estimation unit 68 changes the microphone 45 used to collect sounds in order to make the SNR sufficient. Accordingly, the SNR estimation unit 68 makes the SNR sufficient by increasing the SNR of the next control cycle layer than that of the current control cycle.

Figure 11:
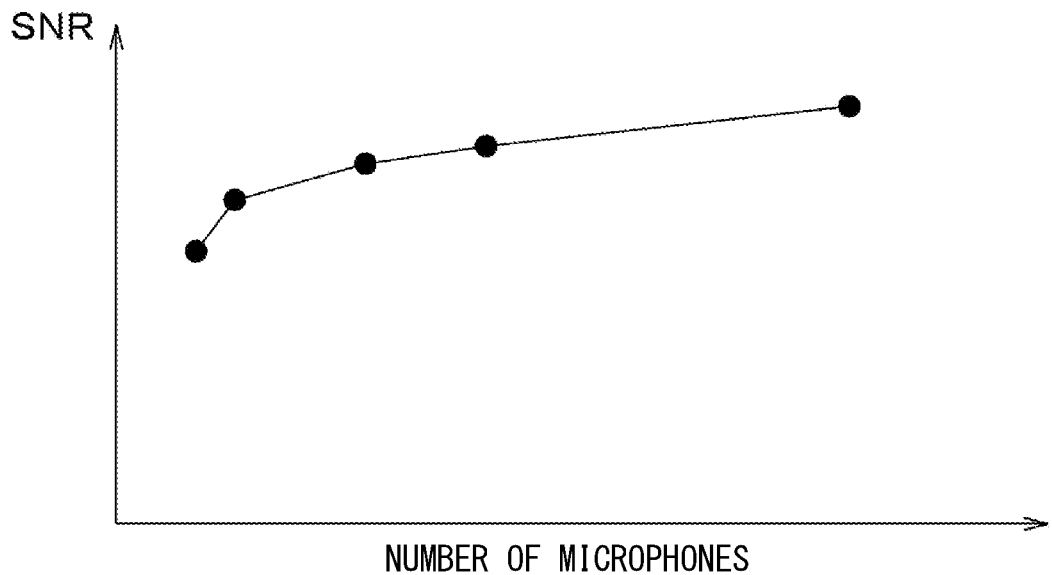
FIG. 11 is a diagram illustrating a relationship between the number of microphones and the SNR.

Here, as shown in FIG. 11, in a case where the sound pressure and the number of noises and the sound pressure of the speech sound are fixed, the SNR increases as the number of microphones 45 increases. Therefore, in S410, for example, the SNR estimation unit 68 increases the number of microphones 45 used to collect sounds in the next control cycle to be larger than that in the current control cycle and sets the number of increase in the microphones 45. Accordingly, the SNR of the next control cycle is larger than the SNR of the current control cycle.

Figure 12:
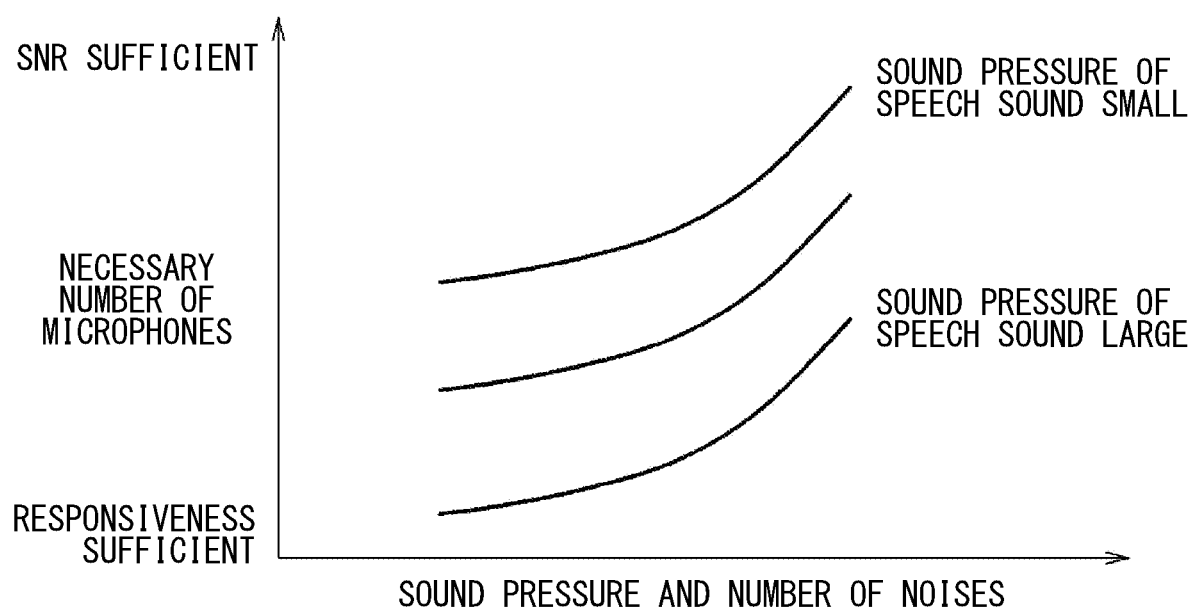
FIG. 12 is a diagram illustrating a relationship between the sound pressure and the number of noises, the number of microphones, the sound pressure of speech sound, the SNR, and the responsiveness.

As shown in FIG. 12, in a case where the number of microphones 45 and the sound pressure of the speech sound are fixed, the SNR decreases as the sound pressure of noise increases or the number of noises increases. Therefore, in S410, the SNR estimation unit 68 changes the number of increase in the microphones 45 used to collect sounds, for example, according to the number of types of noises. Further, in S410, the SNR estimation unit 68 changes the number of increase in the microphones 45 used to collect sounds, for example, according to the sound pressure of the noise. Accordingly, the SNR in the next control cycle is likely to be equal to or greater than the SN threshold SNR_th.

In a case where the sound pressure and the number of noises and the number of the microphones 45 are fixed, the SNR decreases as the sound pressure of the utterance by the occupant decreases. Therefore, in S410, the SNR estimation unit 68 changes the number of increase in the microphones 45 used to collect sounds according to the sound pressure of the utterance of the occupant, for example. Accordingly, the SNR in the next control cycle is likely to be equal to or greater than the SN threshold SNR_th.

In this manner, the SNR estimation unit 68 increases the SNR in the next control cycle to be larger than that in the current control cycle by changing the number of the microphones 45. Thereafter, the processing of the SNR estimation unit 68 returns to S400.

In S412 subsequent to S408, since the SNR is sufficient, the SNR estimation unit 68 outputs the speech sound data of the designated occupant among the speech sound data generated in S404 to the speech recognition device 20. The speech recognition device 20 converts the speech sound data output from the SNR estimation unit 68 into character data using a speech recognition engine or the like. The speech recognition device 20 outputs the converted character data to a display unit (not shown), for example. Thus, characters corresponding to the speech sound by the occupant in the vehicle cabin are displayed by the display unit (not shown). Thereafter, the processing of the SNR estimation unit 68 returns to S400.

The SNR estimation unit 68 performs the processing as described above.

In the microphone system 30, therefore, the speech sound in the vehicle cabin is recognized through the processing of the occupant estimation unit 62, the space estimation unit 64, the vehicle state estimation unit 66, and the SNR estimation unit 68. Next, suppression of a decrease in the speech recognition rate by the microphone system 30 will be described.

Here, the decrease of the SNR related to the speech sound will be described. As a first comparative example, in a sound collection processing device in which an acoustic signal from an object is separated based on coordinates and features of the object without consideration of spatial noise such as reflected sound generated in a space where the object is present, the SNR of the sound from the object is likely to decrease. As a result, when the object is, for example, a human, the SNR of the speech sound decreases, and thus the speech recognition rate of the object decreases.

As a second comparative example, there is a sound collection device in which a direction to collect a sound is controlled based on a direction of a sound source on a speaking side and a direction along a visual line of a listener in a captured image indicated by an image data. Further, in the sound collection device of the second comparative example, the noise due to the space, such as the reflected sound generated in the space where the sound source is present, is not taken into consideration. In this case, the SNR related to the sound from the sound source decreases. Accordingly, when the sound source is, for example, a voice of a person, the SNR of the speech sound decreases, and thus the speech recognition rate decreases.

In contrast, in the present embodiment, the SNR estimation unit 68 classifies, in S404, the type of sound included in the sound data into the type of speech sound of the occupant in the vehicle cabin and the type of noise on the basis of the data of the sound collected by the microphone 45 and the reflection time difference $\Delta Tr$. The reflection time difference $\Delta Tr$ is the arrival time difference of the sounds reflected in the vehicle cabin with respect to the same microphone 45, and corresponds to a value related to a reflection sound reflected in the acoustic space Sb. The occupant corresponds to a human.

Accordingly, the speech sound by the occupant is classified from the sound collected by the microphone 45 in consideration of the noise due to the reflected sound generated in the acoustic space Sb. Therefore, since the increase in noise included in the classified speech sound is suppressed, a decrease in the SNR of the speech sound is suppressed. As such, a decrease in the speech recognition rate is suppressed.

The microphone system 30 of the first embodiment also achieves the following effects.

[1-1] In S404, the SNR estimation unit 68 classifies the sound included in the sound data into the type of speech sound of the occupant in the vehicle cabin and the type of noise on the basis of the audio sound time difference ΔTa, the air conditioner sound time difference ΔTw, and the traveling sound time difference ΔTc. The audio sound time difference ΔTa is the arrival time difference of the sounds by the audio 12 with respect to the same microphone 45, and corresponds to the arrival time difference of the sounds, other than the sounds generated in the acoustic space Sb, with respect to the same microphone 45. The air conditioner sound time difference ΔTw is the arrival time difference of the sounds by the air conditioner 14 with respect to the same microphone 45, and corresponds to the arrival time difference of the sounds, other than the speech sound generated in the acoustic space Sb, with respect to the same microphone 45. The traveling sound time difference ΔTc is the arrival time difference of the wind noises of the vehicle 5 with respect to the same microphone 45, and corresponds to the arrival time difference of the sounds, other than the speech sound generated in the acoustic space Sb, with respect to the same microphone 45.

Accordingly, the speech sound of the occupant is classified from the sound collected by the microphone 45 in consideration of the noise due to the audio 12, the air conditioner 14, and the wind noise generated in the acoustic space Sb. Therefore, since an increase in noise included in the classified speech sound is suppressed, a decrease in the SNR related to the speech sound is suppressed. As such, a decrease in the speech recognition rate is suppressed.

[1-2] The frequency and the sound pressure are different depending on the speech sound and the noise, and the utterance pitch P and the utterance time difference OTs are different depending on the occupant. Therefore, in S404, the SNR estimation unit 68 classifies the sound included in the sound data into the type of speech sound of the occupant in the vehicle cabin and the type of noise on the basis of the frequency, the sound pressure, the utterance pitch P, and the utterance time difference OTs. As such, classification of the type of sound included in the sound data is facilitated. Note that the utterance time difference OTs is a time difference of the arrival time of the speech sound by the occupant between the microphones 45.

[1-3] In S404, the SNR estimation unit 68 estimates the audio sound time difference ΔTa, the air conditioner sound time difference ΔTw, and the traveling sound time difference ΔTc based on the state of the audio 12, the state of the air conditioner 14, the vehicle speed, and the state of the road surface on which the vehicle 5 travels. The SNR estimation unit 68 classifies the sound included in the sound data into the type of speech sound of the occupant in the vehicle cabin and the type of noise on the basis of the estimated audio sound time difference ΔTa, the estimated air conditioner sound time difference ΔTw, and the estimated traveling sound time difference ΔTc. Accordingly, in the microphone system 30 used in the vehicle 5, the speech sound by the occupant is classified from the sound collected by the microphone 45 in consideration of the noises that are sounds, other than the speech sound, generated in the acoustic space Sb. Therefore, since the increase in noise included in the classified speech sound is suppressed, the decrease in SNR of the speech sound is suppressed. As such, the decrease in the speech recognition rate is suppressed.

[1-4] In S408, the SNR estimation unit 68 determines whether or not the SNR of each audio data calculated in S406 is equal to or greater than the SN threshold SNR_th. When the SNR is less than the SN threshold SNR_th, since the SNR is insufficient, the SNR estimation unit 68 increases, in step 410, the SNR of the speech sound by increasing the number of microphones 45 used to collect sounds to be larger than that of the current time. As a result, the SNR of the speech sound is increased, and thus the decrease in the speech recognition rate is suppressed. The SNR estimation unit 68 corresponds to a changing unit. In addition, the current time corresponds to a time in which the SNR is less than the SN threshold SNR_th.

[1-5] As described above, the SNR varies depending on the number of the types of noise, the sound pressure of the noise, and the sound pressure of the speech sound. In addition, as the number of microphones 45 used to collect sounds increases, although the SNR increases, the responsiveness of the output of the audio data to the input of the audio data, in which the calculation load increases, decreases. Therefore, in S410, the SNR estimation unit 68 changes the number of increase in the microphones 45 used to collect sounds according to the number of types of noise, the sound pressure of noise, and the sound pressure of speech. Accordingly, since the number of increase in the microphones 45 is adjusted, the SNR can be increased to a sufficient level, and an excessive decrease in responsiveness is suppressed.

Second Embodiment

Figure 13:
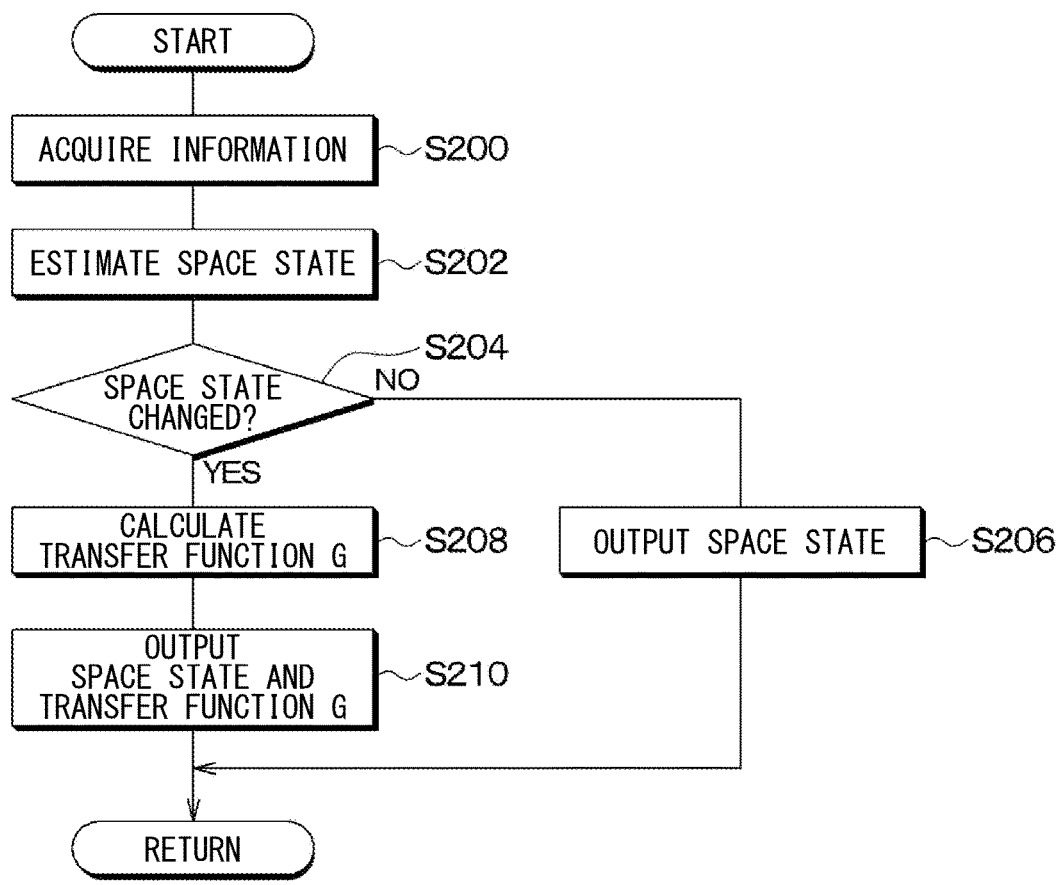
FIG. 13 is a flowchart illustrating processing of a space estimation unit of an arithmetic device in a microphone system according to a second embodiment and a third embodiment.

The second embodiment is different from the first embodiment in the processing of the space estimation unit 64 and the SNR estimation unit 68. The other configurations of the second embodiment are similar to those of the first embodiment. First, the processing of the space estimation unit 64 in the second embodiment will be described with reference to the flowchart of FIG. 13.

In S200, the space estimation unit 64 acquires signals corresponding to the size of the acoustic space Sb in the vehicle cabin, the position, type, and size of an object in the vehicle cabin, and the window opening degree from the environment sensor 54.

Subsequently, in S202, the space estimation unit 64 estimates the size of the acoustic space Sb in the vehicle cabin, the position, the type, and the size of the object in the vehicle cabin, and the window opening degree from the signals acquired in S200. Thus, the space estimation unit 64 estimates the state of the acoustic space Sb in the vehicle cabin.

Subsequently, in S204, the space estimation unit 64 determines whether or not the state of the space estimated in S202 has changed. For example, when the absolute value of the difference between the size of the acoustic space Sb in the vehicle cabin of the current control cycle and the size of the acoustic space Sb in the vehicle cabin of the previous control cycle is equal to or greater than a threshold value, the space estimation unit 64 determines that the state of the acoustic space Sb has changed. When the absolute value of the difference between the coordinates of the position of the object in the vehicle cabin of the current control cycle and the coordinates of the position of the object in the vehicle cabin of the previous control cycle is equal to or greater than the threshold value, the space estimation unit 64 determines that the state of the acoustic space Sb has changed. Further, when the type of the object in the vehicle cabin of the current control cycle is different from the type of the object in the vehicle cabin of the previous control cycle, the space estimation unit 64 determines that the state of the acoustic space Sb has changed. When the absolute value of the difference between the size of the object in the vehicle cabin of the current control cycle and the size of the object in the vehicle cabin of the previous control cycle is equal to or greater than the threshold value, the space estimation unit 64 determines that the state of the acoustic space Sb has changed. Each of the thresholds is set by an experiment, a simulation, machine learning, or the like so as to enable the determination of the change in the state of the acoustic space Sb.

Further, it is assumed that the absolute value of the difference between the size of the acoustic space Sb in the vehicle cabin of the current control cycle and the size of the acoustic space Sb in the vehicle cabin of the previous control cycle is less than the threshold value. It is also assumed that the absolute value of the difference between each coordinate of the position of the object in the vehicle cabin of the current control cycle and each coordinate of the position of the object in the vehicle cabin of the previous control cycle is less than the threshold value. It is further assumed that the type of the object in the vehicle cabin of the current control cycle is the same as the type of the object in the vehicle cabin of the previous control cycle. It is further assumed that the absolute value of the difference between the size of the object in the vehicle cabin of the current control cycle and the size of the object in the vehicle cabin of the previous control cycle is less than the threshold value. In this case, the space estimation unit 64 determines that the spatial state has not changed.

In S206 subsequent to S204, since the state of the acoustic space Sb has not changed, the space estimation unit 64 outputs a signal corresponding to the state of the acoustic space Sb in the vehicle cabin estimated in S202 to the SNR estimation unit 68. Thereafter, the processing of the space estimation unit 64 returns to S200.

In S208 subsequent to S204, the space estimation unit 64 calculates a transfer function G for correcting a frequency threshold value, a sound pressure threshold value, a pitch threshold value, an utterance threshold value, a reflection threshold value, an audio time difference threshold value, an air conditioner time difference threshold value, and a traveling sound time difference threshold value, which will be described later.

Specifically, the space estimation unit 64 causes a speaker to generate a reference sound such as an impulse sound, white noise, or an M-sequence (maximal length sequence). The space estimation unit 64 causes the microphone array 40 to collect the generated reference sound. Further, the space estimation unit 64 calculates the transfer function G by dividing the amplitude of the sound collected by the microphone array 40 by the amplitude of the reference sound. The reference sound is an ultrasonic wave having a frequency of 20 kHz or more, and is an impulse sound, white noise, M-sequence, or the like. The reference sound may be an audible sound having a frequency of 20 Hz to 20 kHz.

Subsequently, in S210, the space estimation unit 64 outputs a signal corresponding to the transfer function G calculated in S208 to the SNR estimation unit 68, in addition to the signal corresponding to the state of the acoustic space Sb in the vehicle cabin estimated in S202. Thereafter, the processing of the space estimation unit 64 returns to S200.

The space estimation unit 64 performs the processing as described above. Next, the processing of the SNR estimation unit 68 will be described with reference to the flowchart of FIG. 7.

In S400, the SNR estimation unit 68 acquires, from the space estimation unit 64, the signal corresponding to the transfer function G in addition to the signals corresponding to the size of the acoustic space Sb in the vehicle cabin, the position, type, and size of an object in the vehicle cabin, and the window opening degree. In addition, the SNR estimation unit 68 acquires the signals corresponding to the occupant position and the number of occupants in the vehicle cabin from the occupant estimation unit 62. Further, the SNR estimation unit 68 acquires the signals corresponding to the state of the audio 12, the state of the air conditioner 14, the speed of the vehicle 5, and the state of the road surface on which the vehicle 5 travels, from the vehicle state estimation unit 66.

Subsequently, in S402, the SNR estimation unit 68 performs the process in a similar manner to that of the first embodiment. Therefore, the description of the process of S402 will not be repeated.

In S404 subsequent to S402, the SNR estimation unit 68 performs the frequency analysis of the sound data generated in S402, and estimates the utterance time difference OTs, the utterance pitch P, and the reflection time difference ΔTr, similar to the first embodiment. In addition, the SNR estimation unit 68 estimates the sound pressure due to the utterance of the occupant, the sound pressure due to the audio 12, the sound pressure due to the air conditioner 14, the sound pressure due to the wind noise of the vehicle 5, and the sound pressure due to the vibration of the vehicle 5. Further, the SNR estimation unit 68 estimates the audio sound time difference ΔTa, the air conditioner sound time difference ΔTw, and the traveling sound time difference ΔTc.

The SNR estimation unit 68 corrects the frequency threshold value, the sound pressure threshold value, the pitch threshold value, the utterance threshold value, the reflection threshold value, the audio time difference threshold value, the air conditioner time difference threshold value, and the traveling sound time difference threshold value by using the transfer function G acquired in S400 and machine learning.

Then, the SNR estimation unit 68 classifies the type of sound included in the sound data into the type of speech sound and the type of noise using the sound data subjected to the frequency analysis and the corrected frequency threshold value. Also, the SNR estimation unit 68 classifies the type of sound included in the sound data into the type of speech sound and the type of noise using the sound data generated in S402 and the corrected sound pressure threshold value. The SNR estimation unit 68 classifies the type of sound included in the sound data into the type of speech sound and the type of noise by using the utterance pitch P estimated above and the corrected pitch threshold value. The SNR estimation unit 68 classifies the type of sound included in the sound data into the type of speech sound and the type of noise using the utterance time difference OTs estimated above and the corrected utterance threshold value. The SNR estimation unit 68 classifies the type of sound included in the sound data into the type of speech sound and the type of noise by using the reflection time difference ΔTr estimated above and the corrected reflection threshold value. The SNR estimation unit 68 classifies the type of sound included in the sound data into the type of speech sound and the type of noise using the audio sound time difference ΔTa estimated as described above and the corrected audio time difference threshold value. Further, the SNR estimation unit 68 classifies the type of sound included in the sound data into the type of speech sound and the type of noise by using the air conditioner sound time difference ΔTw estimated above and the corrected air conditioner time difference threshold value. In addition, the SNR estimation unit 68 classifies the type of sound included in the sound data into the type of speech sound and the type of noise using the traveling sound time difference ΔTc estimated above and the traveling sound time difference threshold value. Accordingly, the SNR estimation unit 68 increases the SNR of the speech sound as compared with the SNR before correction of each threshold value.

Subsequently, in S408 to S412, the SNR estimation unit 68 performs processes in the similar manner to those of the first embodiment. Therefore, the description of the processes of S408 to S412 will not be repeated.

The SNR estimation unit 68 performs the processing as described above. Even when such processing is performed, the similar effects to those of the first embodiment are achieved. The second embodiment also achieves the following effects.

[2-1] In S208, the space estimation unit 64 calculates the transfer function G that represents a value related to a ratio of the amplitude of a sound collected by the microphone 45 to the amplitude of the reference sound, when the reference sound is collected by the microphone 45. In addition, the SNR estimation unit 68 corrects the frequency threshold value, the sound pressure threshold value, the pitch threshold value, the utterance threshold value, the reflection threshold value, the audio time difference threshold value, the air conditioner time difference threshold value, and the traveling sound time difference threshold value on the basis of the transfer function G. Thus, the SNR estimation unit 68 increases the SNR of the classified speech sound, as compared with that before the correction. As such, the decrease in the speech recognition rate is suppressed. The space estimation unit 64 corresponds to a calculation unit.

[2-2] The reference sound is an ultrasonic wave having a frequency of 20 kHz or more. The ultrasonic wave is an inaudible sound. Therefore, the discomfort of the occupant when calculating the transfer function G is suppressed.

Third Embodiment

In the third embodiment, the calculation of the transfer function G in the process of S208 of the space estimation unit 64 is different from that of the second embodiment. The other configurations of the third embodiment are similar to those of the second embodiment.

In S208, the space estimation unit 64 acquires the signals corresponding to the occupant position and the number of occupants in the vehicle cabin from the occupant estimation unit 62. The space estimation unit 64 calculates a transfer function G from the acquired occupant position and the acquired number of occupants, the window opening degree acquired in S200, and a map. The map for calculating the transfer function G is set by an experiment, a simulation, or the like.

In the third embodiment, the space estimation unit 64 calculates the transfer function G as described above. Even when the transfer function G is calculated in this manner, the similar effects to those of the first embodiment are achieved. The third embodiment also achieves the following effects.

[3-1] In S208, the space estimation unit 64 calculates the transfer function G that is the value based on the occupant position, the number of occupants, and the window opening degree. Also, the SNR estimation unit 68 corrects the frequency threshold value, the sound pressure threshold value, the pitch threshold value, the utterance threshold value, the reflection threshold value, the audio time difference threshold value, the air conditioner time difference threshold value, and the traveling sound time difference threshold value on the basis of the transfer function G. Accordingly, the SNR estimation unit 68 increases the SNR of the classified speech sound as compared with that before the correction. Therefore, the decrease in the speech recognition rate is suppressed.

[3-2] In S102, the occupant estimation unit 62 estimates the occupant position and the number of occupants on the basis of the value related to transmission and reception of ultrasonic waves having a frequency of 20 kHz or more. The ultrasonic wave is an inaudible sound. Therefore, discomfort of the occupant at the time of estimating the occupant position and the number of occupants, which are parameters for calculating the transfer function G, is suppressed.

Fourth Embodiment

Figure 14:
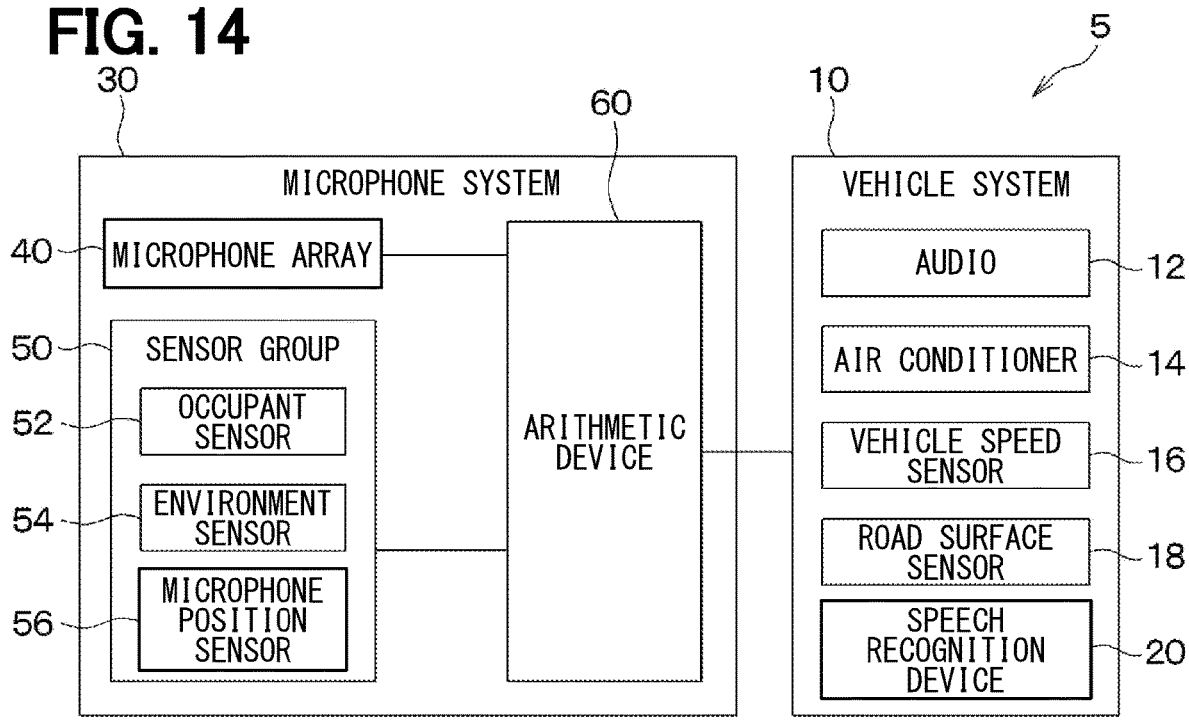
FIG. 14 is a diagram illustrating a configuration of a vehicle in which a microphone system according to a fourth embodiment is used.

In the fourth embodiment, as shown in FIG. 14, the sensor group 50 of the microphone system 30 includes a microphone position sensor 56 in addition to the occupant sensor 52 and the environment sensor 54. Further, the processes of S400 and S404 of the SNR estimation unit 68 are different from those of the first embodiment. The other configurations of the fourth embodiment are similar to those of the first embodiment.

Figure 15:
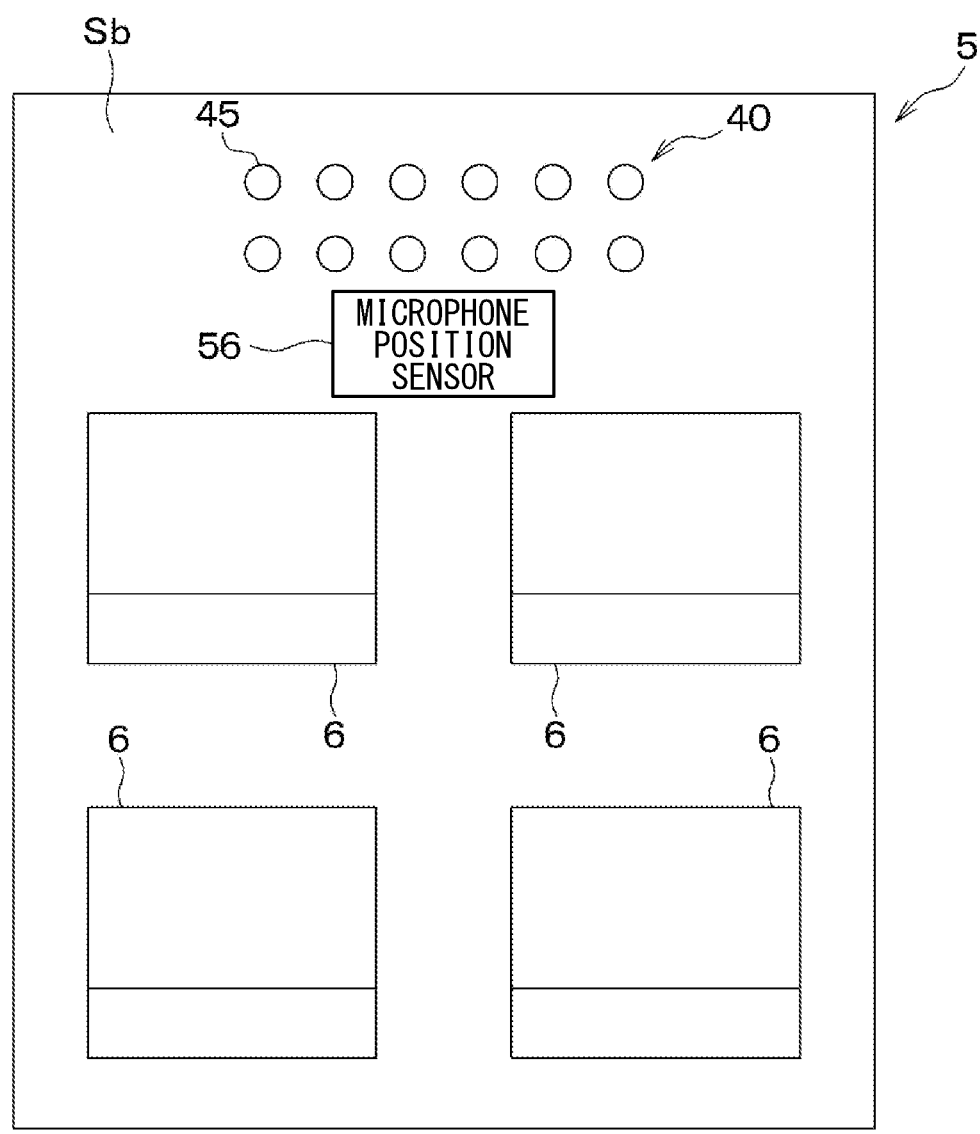
FIG. 15 is a schematic diagram illustrating an acoustic space in a cabin of the vehicle.

As shown in FIG. 15, the microphone position sensor 56 is disposed in the acoustic space Sb. The microphone position sensor 56 detects the position of each microphone 45 in the absolute coordinate system using an ultrasonic sensor or the like. Further, the microphone position sensor 56 outputs a signal corresponding to the detected position of each microphone 45 in the absolute coordinate system to the SNR estimation unit 68. Next, the processing of the SNR estimation unit 68 will be described with reference to the flowchart of FIG. 7.

In S400, the SNR estimation unit 68 acquires a signal corresponding to the position of each microphone 45 in the absolute coordinate system from the microphone position sensor 56, in addition to the acquisition of information from the occupant estimation unit 62, the space estimation unit 64, and the vehicle state estimation unit 66.

Subsequently, in S402, the SNR estimation unit 68 performs the process in the similar manner to that of the first embodiment. Therefore, the description of the process of S402 will not be repeated.

In S404 subsequent to S402, similar to the first embodiment, the SNR estimation unit 68 performs the frequency analysis of the sound data generated in S402, and estimates the utterance time difference OTs, the utterance pitch P, and the reflection time difference ΔTr. In addition, the SNR estimation unit 68 estimates the sound pressure due to the utterance of the occupant, the sound pressure due to the audio 12, the sound pressure due to the air conditioner 14, the sound pressure due to the wind noise of the vehicle 5, and the sound pressure due to the vibration of the vehicle 5. Further, the SNR estimation unit 68 estimates the audio sound time difference ΔTa, the air conditioner sound time difference ΔTw, and the traveling sound time difference ΔTc.

In addition, the SNR estimation unit 68 corrects the frequency threshold value, the sound pressure threshold value, the pitch threshold value, and the utterance threshold value using the position of each microphone 45 in the absolute coordinate system acquired in S400 and machine learning. Further, the SNR estimation unit 68 corrects the reflection threshold value, the audio time difference threshold value, the air conditioner time difference threshold value, and the traveling sound time difference threshold value using the position of each microphone 45 in the absolute coordinate system acquired in S400 and machine learning.

Then, the SNR estimation unit 68 classifies the type of sound included in the sound data into the type of speech sound and the type of noise using the sound data subjected to the frequency analysis and the corrected frequency threshold. The SNR estimation unit 68 classifies the type of sound included in the sound data into the type of speech sound and the type of noise using the sound data generated in S402 and the corrected sound pressure threshold value. The SNR estimation unit 68 classifies the type of sound included in the sound data into the type of speech sound and the type of noise by using the utterance pitch P estimated above and the corrected pitch threshold. The SNR estimation unit 68 classifies the type of sound included in the sound data into the type of speech sound and the type of noise using the utterance time difference OTs estimated above and the corrected utterance threshold value. The SNR estimation unit 68 classifies the type of sound included in the sound data into the type of speech sound and the type of noise by using the reflection time difference $\Delta Tr$ estimated above and the corrected reflection threshold value. The SNR estimation unit 68 classifies the type of sound included in the sound data into the type of speech sound and the type of noise using the audio sound time difference $\Delta Ta$ estimated as described above and the corrected audio time difference threshold. Further, the SNR estimation unit 68 classifies the type of sound included in the sound data into the type of speech sound and the type of noise by using the air conditioner sound time difference $\Delta Tw$ estimated above and the corrected air conditioner time difference threshold value. In addition, the SNR estimation unit 68 classifies the type of sound included in the sound data into the type of speech sound and the type of noise using the traveling sound time difference $\Delta Tc$ estimated above and the traveling sound time difference threshold value. Accordingly, the SNR estimation unit 68 increases the SNR of the speech sound as compared with the SNR before correction of each threshold.

Subsequently, in S408 to S412, the SNR estimation unit 68 performs the processes in the similar manner to those of the first embodiment. Therefore, the description of the processes of S408 to S412 will not be repeated.

The SNR estimation unit 68 performs the processing as described above.

Even when the processing by the SNR estimation unit 68 of the fourth embodiment is performed as described above, the similar effects to those of the first embodiment are achieved. In addition, the fourth embodiment also achieves the following effects.

[4] When the position of the microphone 45 is changed, the sound data collected by the microphone 45 is changed, and thus the SNR of the speech sound is changed. Therefore, the SNR estimation unit 68 corrects the frequency threshold value, the sound pressure threshold value, the pitch threshold value, the utterance threshold value, the reflection threshold value, the audio time difference threshold value, the air conditioner time difference threshold value, and the traveling sound time difference threshold value based on the position of the microphone 45. As such, the SNR estimation unit 68 increases the SNR of the classified speech sound as compared with that before the correction. For this reason, the decrease in the speech recognition rate is suppressed.

OTHER EMBODIMENTS

The present disclosure is not limited to the embodiments described above, and the embodiments described above can be appropriately modified. The constituent element(s) of each of the embodiments described above is/are not necessarily essential unless it is specifically stated that the constituent element(s) is/are essential in the embodiment, or unless the constituent element(s) is/are obviously essential in principle.

The sound collection unit, the clustering unit, the output unit, the calculation unit, the changing unit, the estimation unit, and the methods thereof described in the present disclosure may be realized by a dedicated computer provided by configuring a processor and a memory programmed to execute one or more functions embodied by a computer program. Alternatively, the sound collection unit, the clustering unit, the output unit, the calculation unit, the changing unit, the estimation unit, and the methods thereof described in the present disclosure may be realized by a dedicated computer provided by configuring a processor by one or more dedicated hardware logic circuits. Alternatively, the sound collection unit, the clustering unit, the output unit, the calculation unit, the changing unit, the estimation unit, and the methods thereof described in the present disclosure may be realized by one or more dedicated computers configured by a combination of a processor and a memory programmed to execute one or more functions and a processor configured by one or more hardware logic circuits. The computer program may be stored, as instructions to be executed by a computer, in a tangible non-transitory computer-readable medium.

In each of the embodiments described above, each of the frequency threshold value, the sound pressure threshold value, the pitch threshold value, the utterance threshold value, the reflection threshold value, the audio time difference threshold value, the air conditioner time difference threshold value, and the traveling sound time difference threshold value for classifying the type of speech sound and the type of noise is set to a single value. On the other hand, the number of each threshold value is not limited to one, and may be set to two values or more.

In each of the embodiments described above, the parameters for classifying the type of sound included in the sound data into the type of speech and the type of noise are the number of speech sounds, the utterance time difference OTs, the frequency component of the sound data, the utterance pitch P, and the reflection time difference $\Delta Tr$. Parameters for classifying the type of sound included in the sound data into the type of speech sound and the type of noise are the sound pressure due to the utterance of the occupant, the sound pressure due to the audio 12, the sound pressure due to the air conditioner 14, the sound pressure due to the wind noise of the vehicle and the sound pressure due to the vibration of the vehicle 5. Further, parameters for classifying the type of sound included in the sound data into the type of speech sound and the type of noise are the audio sound time difference $\Delta Ta$, the air conditioner sound time difference $\Delta Tw$, and the traveling sound time difference $\Delta Tc$. On the other hand, the SNR estimation unit 68 is not limited to classify the type of sound included in the sound data into the type of speech sound and the type of noise using all the parameters described above. The SNR estimation unit 68 may classify the type of sound included in the sound data into the type of speech sound and the type of noise using at least one of the above parameters.

In each of the embodiments described above, the value related to the sound reflected in the acoustic space Sb is the reflection time difference ΔTr. On the other hand, the value related to the reflection sound reflected in the acoustic space Sb is not limited to the reflection time difference ΔTr. Since the reflectance and the attenuation rate of the reflected sound vary depending on the state of the acoustic space Sb in the vehicle cabin, the value related to the reflection sound reflected in the acoustic space Sb may be, for example, the sound pressure of the reflection sound reflected in the acoustic space Sb.

The embodiments described above may be combined as appropriate.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A microphone system for a vehicle cabin of a vehicle as an acoustic space, comprising:
    a microphone array including a plurality of microphones arrayed in a plurality of rows on a plane at a part of the vehicle cabin in front of vehicle seats in the vehicle cabin, each row of the plurality of rows including at least two microphones of the plurality of microphones; and
    a processor and a memory configured to:
        cause a two or more of the plurality of microphones to collect a sound;
        classify a sound included in a sound data related to the sound collected by the two or more of the plurality of microphones into a type of speech sound of a human present in the acoustic space as classified speech sound and a type of noise that is other than the speech sound, based on a direction of sound determined by arrival time differences at the two or more of the plurality of microphones, a value related to a reflection sound reflected in the acoustic space, and a value related to an arrival time difference of the speech sound between at least two of the two or more of the plurality of microphones; and
        output data related to the classified speech sound to a speech recognition device.

2. The microphone system according to claim 1, wherein the processor is further configured to:
    calculate a transfer function that is a value related to a ratio of an amplitude of a collected reference sound to an amplitude of a reference sound, the collected reference sound being the sound collected by the two or more of the plurality of microphones when the reference sound is generated,
    classify the sound using the value related to the reflection sound reflected in the acoustic space and a reflection threshold value, and
    correct the reflection threshold value based on the transfer function so as to increase a signal-to-noise ratio of the classified speech sound to be larger than that before the reflection threshold value is corrected.

3. The microphone system according to claim 1, wherein the processor is further configured to:
    calculate a transfer function that is a value based on an occupant position in the vehicle cabin, a number of occupant in the vehicle cabin, and an opening degree of a side window of the vehicle,
    classify the sound using the value related to the reflection sound reflected in the acoustic space and a reflection threshold value, and
    correct the reflection threshold value based on the transfer function so as to increase a signal-to-noise ratio of the classified speech sound to be larger than that before the reflection threshold value is corrected.

4. The microphone system according to claim 1, wherein the processor is further configured to:
    classify the sound using the value related to the reflection sound reflected in the acoustic space and a reflection threshold value, and
    correct the reflection threshold value based on a position of the two or more of the plurality of microphones so as to increase a signal-to-noise ratio of the classified speech sound to be larger than that before the reflection threshold value is corrected.

5. The microphone system according to claim 1, wherein the processor is further configured to:
    classify the sound included in the sound data into the type of speech sound and the type of noise based on a value related to an arrival time difference of sounds, which are other than the speech sound, generated in the acoustic space and arrived at a same microphone.

6. The microphone system according to claim 5, the processor is further configured to:
    calculate a transfer function that is a value related to a ratio of an amplitude of a collected reference sound to an amplitude of a reference sound, the collected reference sound being the sound collected by the two or more of the plurality of microphones when the reference sound is generated,
    classify the sound using the value related to the arrival time difference and a time difference threshold value, and
    correct the time difference threshold value based on the transfer function so as to increase a signal-to-noise ratio of the classified speech sound to be larger than that before the time difference threshold value is corrected.

7. The microphone system according to claim 5, the processor is further configured to:
    calculate a transfer function that is a value based on an occupant position in the vehicle cabin, a number of occupant in the vehicle cabin, and an opening degree of a side window of the vehicle,
    classify the sound using the value related to the arrival time difference and a time difference threshold value, and
    correct the time difference threshold value based on the transfer function so as to increase a signal-to-noise ratio of the classified speech sound to be larger than that before the time difference threshold value is corrected.

8. The microphone system according to claim 5, wherein the processor is further configured to:
    classify the sound using the value related to the arrival time difference and a time difference threshold value, and
    correct the time difference threshold value based on a position of the two or more of the plurality of microphones so as to increase a signal-to-noise ratio of the classified speech sound to be larger than that before the time difference threshold value is corrected.

9. The microphone system according to claim 1, wherein the processor is further configured to:
classify the sound included in the sound data into the type of speech sound and the type of noise based on a value related to a sound pressure of the sound data.

10. The microphone system according to claim 9, wherein the processor is further configured to:
calculate a transfer function that is a value related to a ratio of an amplitude of a collected reference sound to an amplitude of a reference sound, the collected reference sound being the sound collected by the two or more of the plurality of microphones when the reference sound is generated,
classify the sound using the value related to the sound pressure of the sound data and a sound pressure threshold value, and
correct the sound pressure threshold value based on the transfer function so as to increase a signal-to-noise ratio of the classified speech sound to be larger than that before the sound pressure threshold value is corrected.

11. The microphone system according to claim 9, wherein the processor is further configured to:
calculate a transfer function that is a value based on an occupant position in the vehicle cabin, a number of occupant in the vehicle cabin, and an opening degree of a side window of the vehicle,
classify the sound using the value related to the sound pressure of the sound data and a sound pressure threshold value, and
correct the sound pressure threshold value based on the transfer function so as to increase a signal-to-noise ratio of the classified speech sound to be larger than that before the sound pressure threshold value is corrected.

12. The microphone system according to claim 9, wherein the processor is further configured to:
classify the sound using the value related to the sound pressure of the sound data and a sound pressure threshold value, and
correct the sound pressure threshold value based on a position of the two or more of the plurality of microphones so as to increase a signal-to-noise ratio of the classified speech sound to be larger than that before the sound pressure threshold value is corrected.

13. The microphone system according to claim 1, wherein the processor is further configured to:
classify the sound into the type of speech sound and the type of noise based on a value related to an utterance pitch that is an interval between notes of utterance by the human.

14. The microphone system according to claim 13, wherein the processor is further configured to:
calculate a transfer function that is a value related to a ratio of an amplitude of a collected reference sound to an amplitude of a reference sound, the collected reference sound being the sound collected by the two or more of the plurality of microphones when the reference sound is generated,
classify the sound using the value related to the utterance pitch and a pitch threshold value, and
correct the pitch threshold value based on the transfer function so as to increase a signal-to-noise ratio of the classified speech sound to be larger than that before the pitch threshold value is corrected.

15. The microphone system according to claim 13, wherein the processor is further configured to:
calculate a transfer function that is a value based on an occupant position in the vehicle cabin, a number of occupant in the vehicle cabin, and an opening degree of a side window of the vehicle,
classify the sound into the type of speech sound and the type of noise using the value related to the utterance pitch and a pitch threshold value, and
correct the pitch threshold value based on the transfer function so as to increase a signal-to-noise ratio of the classified speech sound to be larger than that before the pitch threshold value is corrected.

16. The microphone system according to claim 13, wherein the processor is further configured to:
classify the sound using the value related to the utterance pitch and a pitch threshold value, and
correct the pitch threshold value based on a position of the two or more of the plurality of microphones so as to increase a signal-to-noise ratio of the classified speech sound to be larger than that before the pitch threshold value is corrected.

17. The microphone system according to claim 1, wherein the processor is further configured to:
calculate a transfer function that is a value related to a ratio of an amplitude of a collected reference sound to an amplitude of a reference sound, the collected reference sound being the sound collected by the two or more of the plurality of microphones when the reference sound is generated,
classify the sound using the value related to the arrival time difference and an utterance threshold value, and
correct the utterance threshold value based on the transfer function so as to increase a signal-to-noise ratio of the classified speech sound to be larger than that before the utterance threshold value is corrected.

18. The microphone system according to claim 1, wherein the processor is further configured to:
calculate a transfer function that is a value based on an occupant position in the vehicle cabin, a number of occupant in the vehicle cabin, and an opening degree of a side window of the vehicle,
classify the sound using the value related to the arrival time difference and an utterance threshold value, and
correct the utterance threshold value based on the transfer function so as to increase a signal-to-noise ratio of the classified speech sound to be larger than that before the utterance threshold value is corrected.

19. The microphone system according to claim 1, wherein the processor is further configured to:
classify the sound using the value related to the arrival time difference and an utterance threshold value, and
correct the utterance threshold value based on a position of the two or more of the plurality of microphones so as to increase a signal-to-noise ratio of the classified speech sound to be larger than that before the utterance threshold value is corrected.

20. The microphone system according to claim 1, wherein the processor is further configured to:
classify the sound into the type of speech sound and the type of noise based on a value related to a frequency component of the sound data.

21. The microphone system according to claim 20, wherein the processor is further configured to:
calculate a transfer function that is a value related to a ratio of an amplitude of a collected reference sound to an amplitude of a reference sound, the collected reference sound being the sound collected by the two or more of the plurality of microphones when the reference sound is generated,
classify the sound using the value related to the frequency component and a frequency threshold value, and
correct the frequency threshold value based on the transfer function so as to increase a signal-to-noise ratio of the classified speech sound to be larger than that before the frequency threshold value is corrected.

22. The microphone system according to claim 20, wherein the processor is further configured to:
calculate a transfer function that is a value based on an occupant position in the vehicle cabin, a number of occupant in the vehicle cabin, and an opening degree of a side window of the vehicle,
classify the sound using the value related to the frequency component and a frequency threshold value, and
correct the frequency threshold value based on the transfer function so as to increase a signal-to-noise ratio of the classified speech sound to be larger than that before the frequency threshold value is corrected.

23. The microphone system according to claim 20, wherein the processor is further configured to:
classify the sound using the value related to the frequency component and a frequency threshold value, and
correct the frequency threshold value based on positions of the two or more of the plurality of microphones so as to increase a signal-to-noise ratio of the classified speech sound to be larger than that before the frequency threshold value is corrected.

24. The microphone system according to claim 1, wherein the processor is further configured to:
classify the sound included in the sound data into the type of speech sound and the type of noise based on a state of an audio of the vehicle, a state of an air conditioner of the vehicle, a speed of the vehicle, and a state of a road surface on which the vehicle travels.

25. The microphone system according to claim 1, wherein the processor is further configured to:
change a number of how many of the plurality of microphones are used to collect the sound to be larger than that of a current number, in response to a value related to a signal-to-noise ratio of the classified speech sound being less than a threshold value, so as to increase the signal-to-noise ratio of the classified speech sound to be larger than that before the number of the plurality of microphones is increased.

26. The microphone system according to claim 25, wherein the processor is further configured to:
change a number of increase in how many of the plurality of microphones are used to collect the sound according to a value related to a number of the type of noise.

27. The microphone system according to claim 25, wherein the processor is further configured to:
change a number of increase in how many of the plurality of microphones are used to collect the sound according to a value related to a sound pressure of the noise.

28. The microphone system according to claim 25, wherein the processor is further configured to:
change a number of increase in how many of the plurality of microphones are used to collect the sound according to a value related to a sound pressure of the speech sound.

29. The microphone system according to claim 2, wherein:
the reference sound is an ultrasonic wave having a frequency of 20 KHz or more.

30. The microphone system according to claim 3, wherein the processor is further configured to:
estimate the occupant position and the number of occupant based on a value related to transmission and reception of ultrasonic waves having a frequency of 20 KHz or more.

31. The microphone system according to claim 1, wherein the processor is further configured to:
estimate the value related to the reflection sound reflected in the acoustic space based on the sound data, a size of the acoustic space, a position of an object in the acoustic space, and a size of the object in the acoustic space.

32. The microphone system of claim 1, wherein the processor is further configured to:
determine whether the signal-to-noise ratio is sufficient for speech recognition in comparison to a predetermined signal-to-noise threshold,
in response to determining that the signal-to-noise ratio is not sufficient, increase a number of how many of the plurality of microphones as used to collect the sound so as to increase the signal-to-noise ratio of the classified speech sound for a next time the sound is collected and classified, and
in response to determining that the signal-to-noise ratio is sufficient, output the data related to the classified speech sound to the speech recognition device.

33. The microphone system of claim 1, wherein the processor is further configured to:
classify a sound included in the classified sound data as related to a designated human present in the acoustic space.

* * * * *